Aug. 2, 1966
J. M. MANDULA, JR., ETAL
APPARATUS FOR DEFECT ANALYSIS AND
CLASSIFICATION OF WORKPIECES
3,263,809
Filed May 5, 1964
10 Sheets-Sheet 1
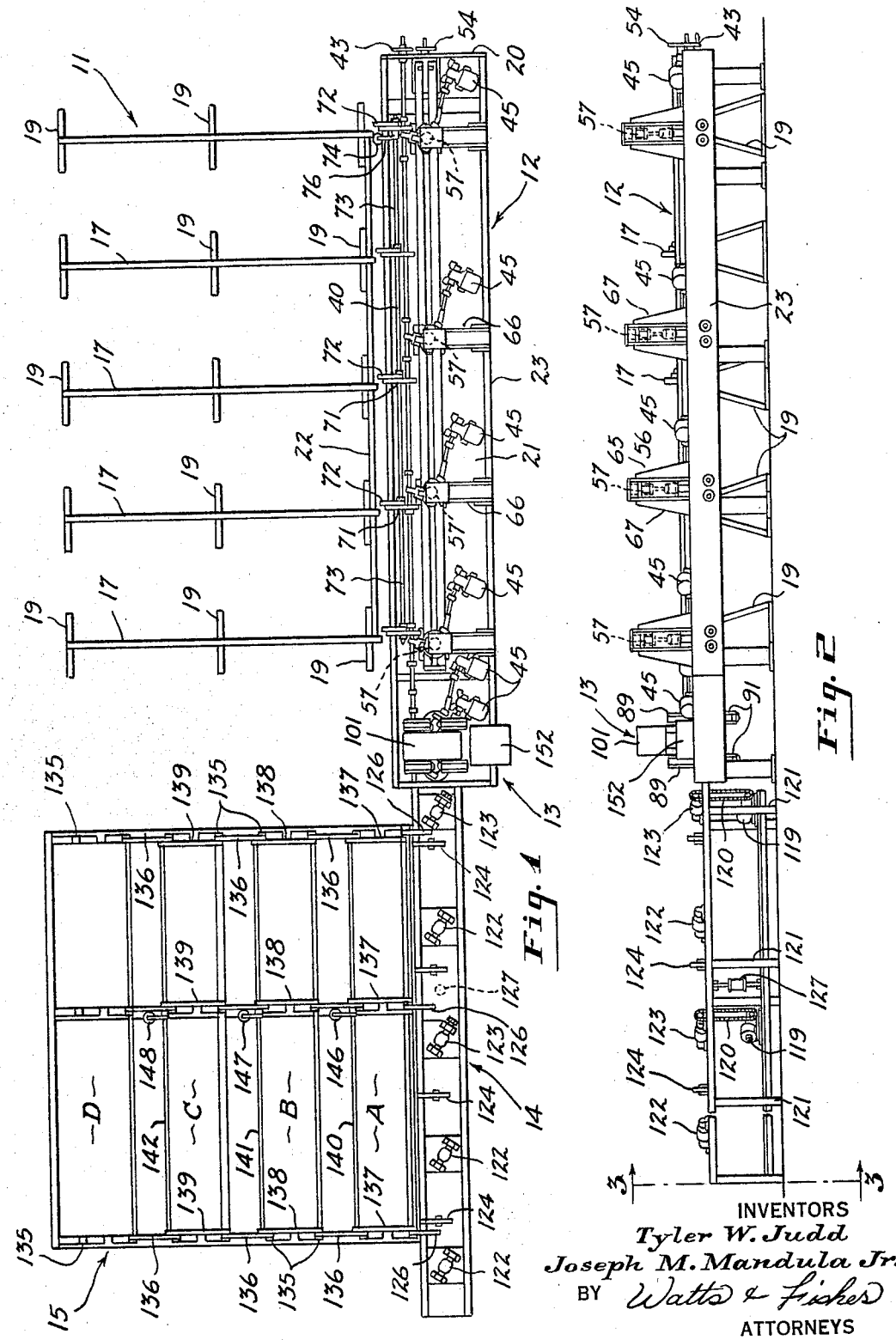
INVENTORS
Tyler W. Judd
Joseph M. Mandula Jr.
BY Watts & Fisher
ATTORNEYS

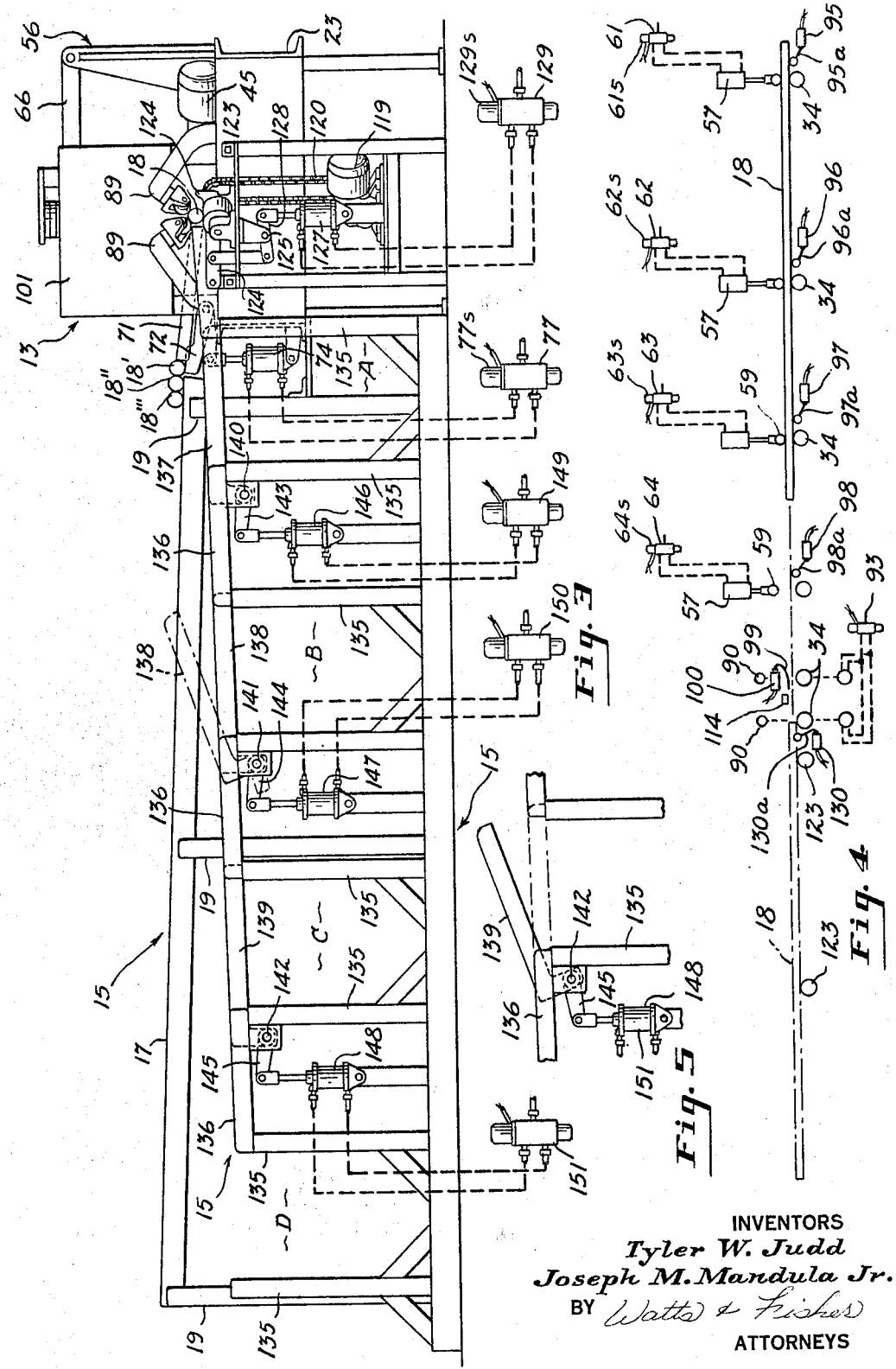

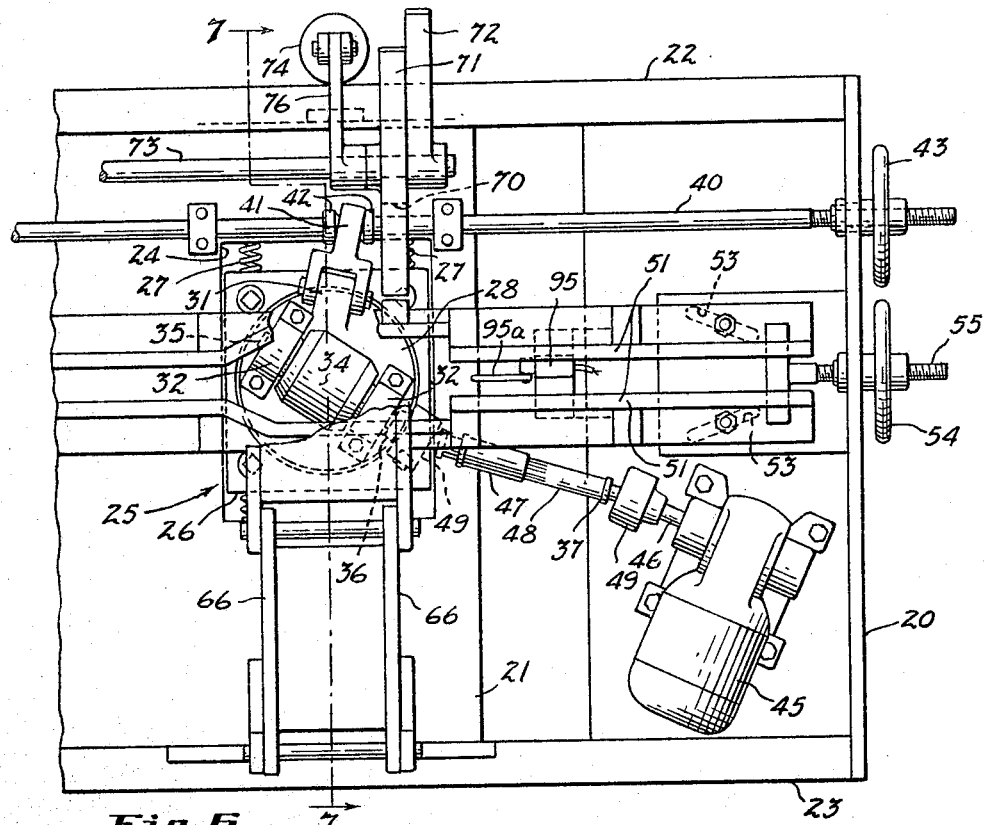

INVENTORS
Tyler W. Judd
Joseph M. Mandula Jr.
BY Watts & Fisher
ATTORNEYS

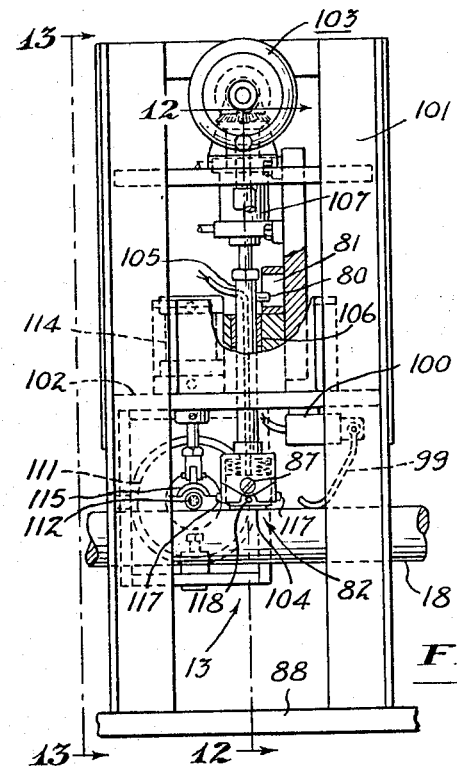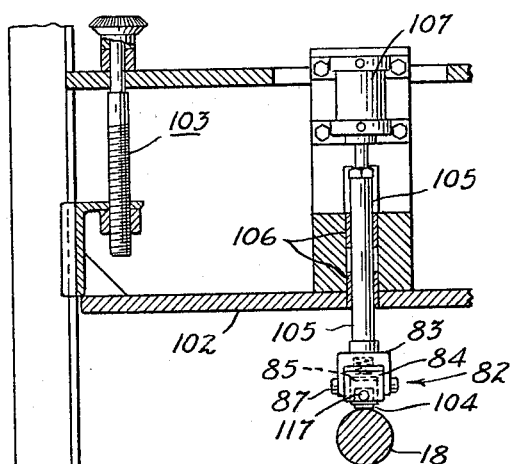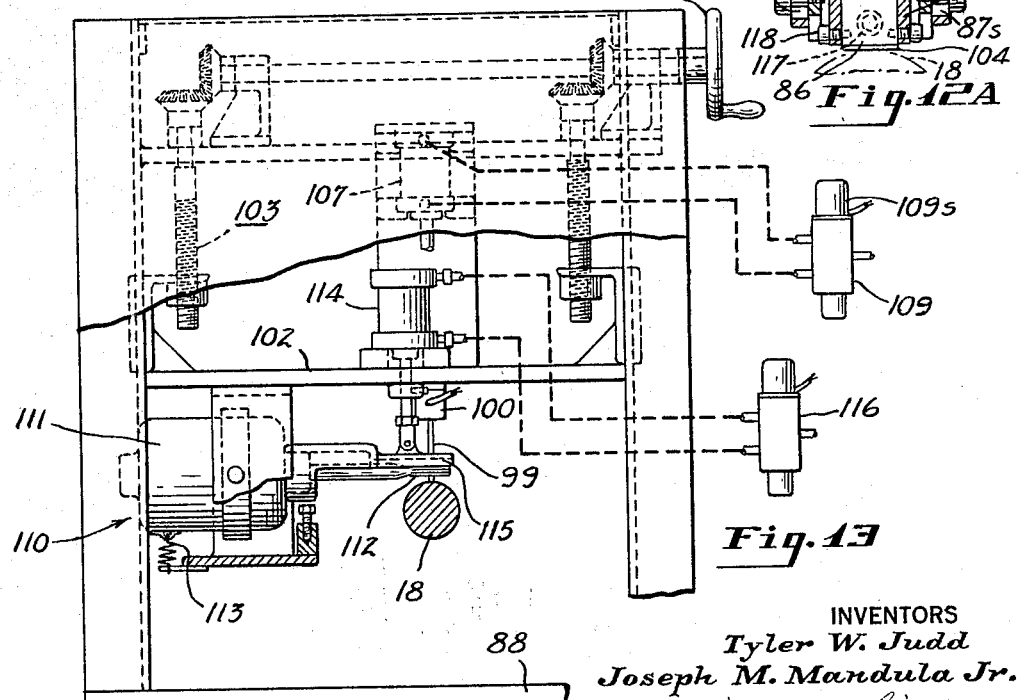

INVENTORS
Tyler W. Judd
Joseph M. Mandula Jr.
BY Watts & Fisher
ATTORNEYS

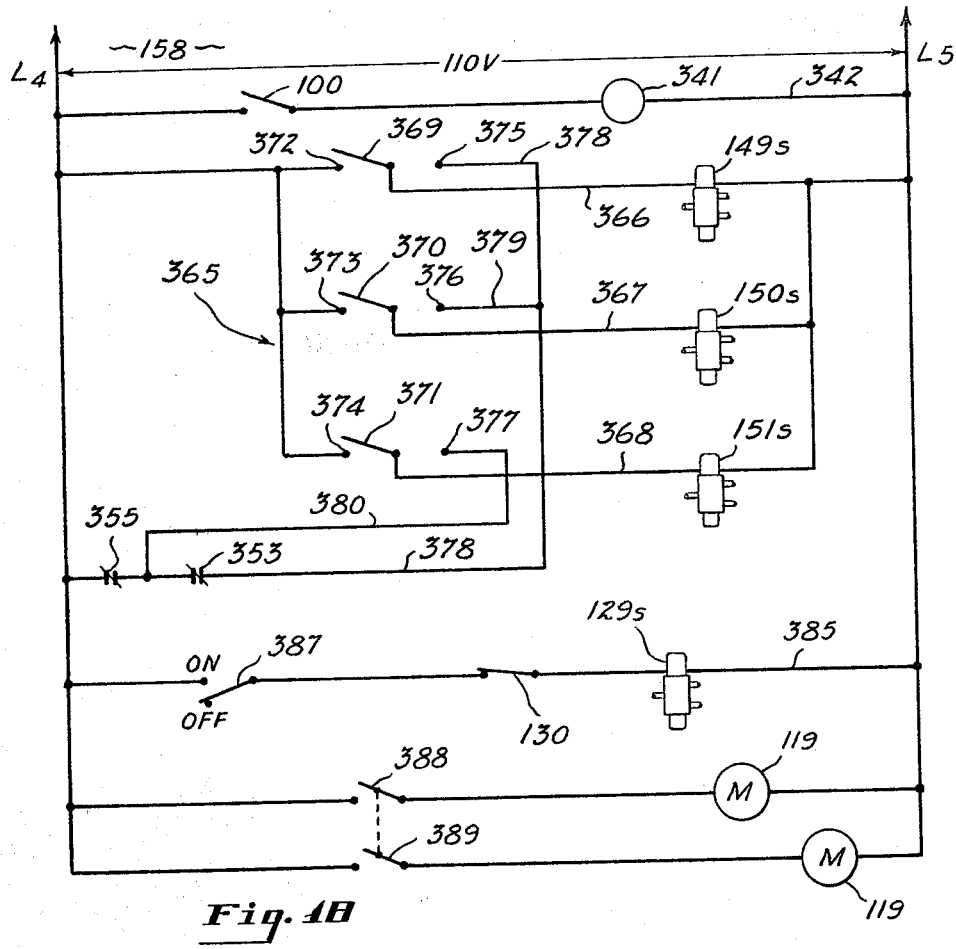
Fig. 18
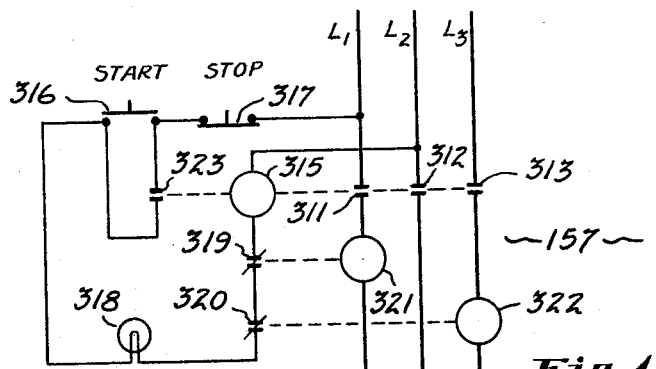
Fig. 19
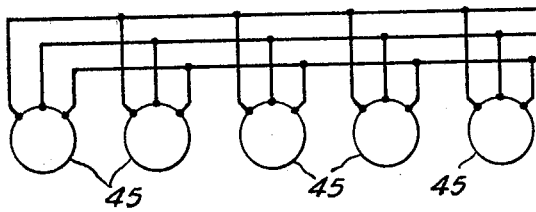
INVENTORS
Tyler W. Judd
Joseph M. Mandula Jr.
BY Watts & Fisher
ATTORNEYS

United States Patent Office 3,263,809
Patented August 2, 1966

3,263,809
APPARATUS FOR DEFECT ANALYSIS AND
CLASSIFICATION OF WORKPIECES
Joseph M. Mandula, Jr., Cleveland, and Tyler W. Judd, Chardon, Ohio, assignors to Republic Steel Corporation, Cleveland, Ohio, a corporation of New Jersey
Filed May 5, 1964, Ser. No. 365,097
24 Claims. (Cl. 209—73)

The present invention relates to the inspection of workpieces for defects and more particularly relates to an apparatus and system for automatic detection of defects and for the classification of workpieces according to their defect severity.

One of the problems and necessary steps in the process of manufacturing steel bars and other workpieces is the detection of seams, flaws and other defects which would be troublesome in a final product made from such workpieces. Often when defects are of a shallow surface nature they may be ground out and the bar salvaged. Where the defects are deep or are many then the bar or workpiece must generally be scrapped.

In the past a common method of inspecting bars for defects was by visual inspection. In spite of the utmost vigilance, a mill inspector often overlooked seams or other defects as when they are tightly closed or obscured by scale. Moreover, visual inspection did not dependably determine the depth of a defect. To accurately determine depth by visual inspection, an inspector had to generally use the time consuming process of filing the workpiece and measuring the seam depth directly with a gauge. Present day production requirements usually limit this type of procedure to only occasional spot checks of the workpieces.

Another problem with visual inspection is that it is dependent on human judgment, vigilance, and vision, all of which are subject to change. Inspection standards may not remain constant even with the same inspector and certainly not with different inspectors. The limitations of visual inspection techniques are not compatible with present demands for higher quality products, greater production, and lower costs.

The present invention provides an apparatus and system which automatically inspects the workpieces, determines objection of defect locations and marks them, and then classifies the workpieces and separates them according to defect severity. In this apparatus, the workpieces are automatically fed through a testing station of a test section where a small search probe rides on the surface of the bar and uses the eddy current principle of seam detection as described in U.S. Patent 2,832,040 to William C. Harmon. The workpiece and the search probe are mounted for relative helical movement so that the periphery of the bar is scanned by the probe. The defect information obtained by the probe is acted upon by a detection circuit which produces an output voltage pulse. The amplitude of the pulse is proportional to the depth of the defect detected. This output voltage is introduced to a classifier section having two channels, one of which produces a trigger signal for each defect output voltage pulse which indicates a deep defect and a second channel which produces a trigger pulse for each defect output voltage pulse indicating either a shallow or a deep seam. These trigger pulses are introduced into an analyzer section which counts the number of shallow and deep defect trigger pulses for a given area or other unit measure of the workpiece and from this information determines the defect severity. The analyzer section then classifies each workpiece according to its defect severity as either a "good," a "salvage," or a "scrap" workpiece.

The "good" classification is given to workpieces which have no defects or defects that are not objectionable in the final product, or defects shallow enough to be removed when the bar is processed. In the workpieces classified as "salvage," the defects are deep enough to be objectionable and must be removed in order for the workpiece to be used for its intended purpose. A "scrap" workpiece is one wherein the defects are so deep or so long it is not possible to salvage the workpiece.

The defect analyzer classifies the workpieces on substantially the same criterion as would a human inspector. This classification is based on primarily three factors:

(1) The total number of defect indications;
(2) The amplitude of the defect indications; and,
(3) The spacing or distribution of the defect indications.

An advantage of the present apparatus, particularly the defect analyzer section, is that classification of the workpieces according to defect severity is always consistent and not subject to human error. Moreover, a qualified person can set up the machine in accordance with the type of product to be inspected and a less qualified person can operate the machine. Since the inspection and classification is done by machine, it eliminates the necessity for an operator to view either the workpieces, charts, or other apparatus and thus reduces human fatigue. Elimination of the human element by the present apparatus also results in increased output.

Accordingly, an object of the present invention is to provide an apparatus for automatically inspecting workpieces for defects and classifying the workpieces according to their defect severity.

Still another object of the present invention is to provide a new and improved apparatus for examining workpieces and classifying them for defects according to the total number of defect indications detected, the depth of the defects, and the spacing or distribution of the defect indications along the workpiece.

Yet another object of the present invention is to provide a new and improved apparatus which inspects workpieces for defects and classifies the workpieces according to the length of the defect.

A further object of the present invention is to provide a new and improved apparatus which inspects workpieces for defects and then separates the workpieces into groups of good, salvageable, or scrap workpieces.

A final object of the present invention is to provide a new and improved apparatus which automatically takes workpieces from storage, examines them for defects, classifies the workpieces according to their defect severity, and then separates them into separate groups of good, salvageable, or scrap workpieces.

Other objects and a fuller understanding of the invention may be had by referring to the following description and claims taken in conjunction with the accompanying drawings in which:

FIGURE 1 is a top plan view of the workpiece classifying apparatus of the present invention.

FIGURE 2 is a front, elevational view of the workpiece classifying apparatus of FIGURE 1.

FIGURE 3 is an end, elevational view of the workpiece classifying apparatus of FIGURE 1.

FIGURE 4 is a schematic illustration of the pneumatic and electrical devices along the path of workpiece travel in the classifying apparatus of FIGURE 1.

FIGURE 5 is an enlarged partial view of an open gate mechanism of the apparatus shown in FIGURE 3.

FIGURE 6 is an enlarged, top plan view, with parts broken away, of one of the propelling assemblies in the classifying apparatus of FIGURE 1.

FIGURE 7 is a section view taken along line 7—7 in FIGURE 6.

FIGURE 11 is an enlarged, front elevational view taken parallel to the path of workpiece travel of the inspection section or station of the classifying apparatus of FIGURE 1.

FIGURE 12 is a sectional view shown in elevation taken along line 12—12 in FIGURE 11.

FIGURE 12a is an enlarged elevational view, with parts in cross section, of the inspection probe assembly in the inspection station.

FIGURE 13 is a sectional view in elevation taken along line 13—13 in FIGURE 11.

FIGURE 18 is an across-the-line diagram of the remainder of the overall control unit of FIGURE 17; and, FIGURE 19 is a schematic circuit diagram of a motor control unit.

Figure 8:
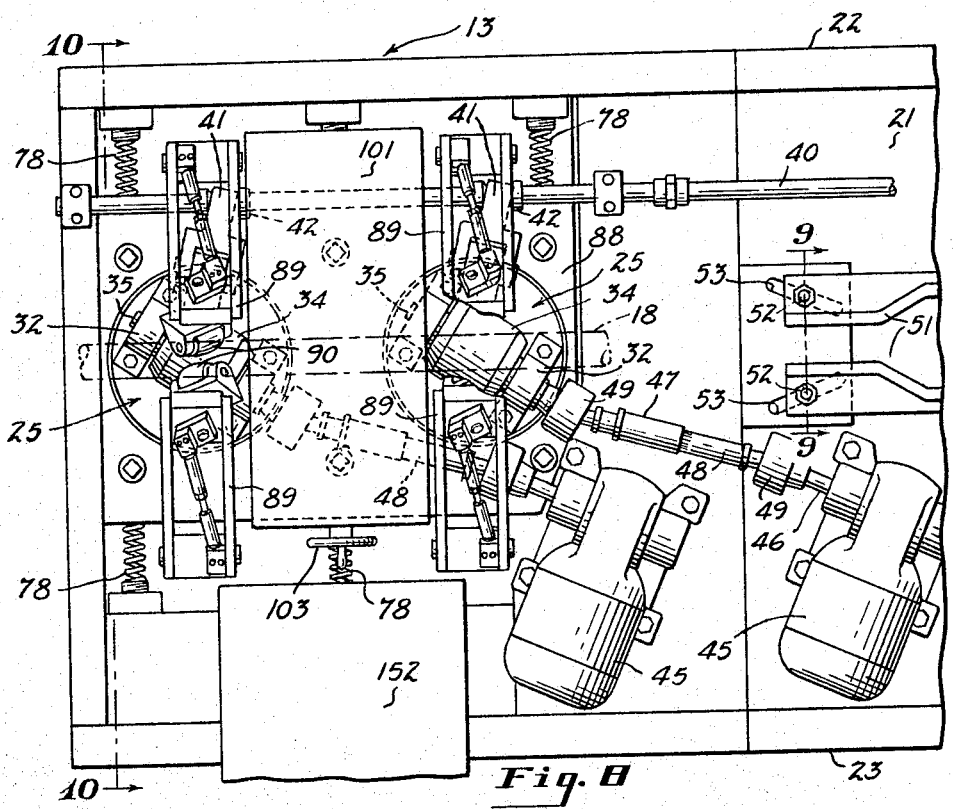
FIGURE 8 is a top plan view of the propelling assembly in the inspection section portion of the workpiece classifying apparatus shown in FIGURE 1.

Referring in particular to FIGURES 1–3, the automatic bar inspection marking and classifying system includes a workpiece storage and feed rack assembly 11, a workpiece entrance section 12, a workpiece inspection station 13, a workpiece exit section 14, and a workpiece segregating bin or cradle assembly 15.

As shown in FIGURES 1 and 3, the workpiece feed rack assembly 11 comprises a plurality of spaced, inclined rack members 17 on which workpieces 18 are stored and gravity fed towards the entrance section 12. Vertical support members 19 are provided to support the inclined rack members 17.

Referring to FIGURES 1, 2, 6 and 7 the entrance section 12 has a base 20 including a base plate 21 which is carried by horizontal channel members 22, 23. The base plate 21 has a plurality of rectangular openings 24 in which a plurality of workpiece propelling or drive assemblies 25 are mounted. There are four such propelling assemblies 25 in the entrance section 12 and two in the inspection station 13. Each propelling assembly 25 includes a rectangular float plate 26 which is carried by and floats on vertical and horizontal springs 27. A circular roller support table plate 28 has a center spindle projection 29 rotatably journaled in a center opening in the float plate 26. A turning arm 31 is fixed to the table plate 28 and projects outwardly beyond the float plate 26.

A pair of pillow blocks 32 are secured to the roller table 28. A roller 34 is disposed between the pillow blocks 32 and is carried by a shaft 35 which is rotatably journaled in the pillow blocks 32. The shaft 35 includes an extended shaft portion 36 which extends past one pillow block 32 for driving connection to an extensible drive shaft 37. The roller 34, which may be metal, rubber or other suitable material, is fixed to the shaft 35 and is driven by it. The axes of rotation of the rollers 34 of all the propelling assemblies 25 are set at a predetermined angle to the line of travel of the workpieces 18 through the entrance section 12 and the inspection station 13. This angle, predetermined by the diameter of the workpieces, is changeable to adjustably control helical travel of the workpiece as will be explained.

An adjusting rod 40 extends the length of the entrance section 12 and is pivotally connected to each of the turning arms 31 by fork shaped arm links 41 and shoulders 42 on the rod 40. An adjusting wheel 43 is rotatably carried by the base plate 21 and is threaded on one end of the adjusting rod 40 so that rotation of the adjusting wheel 43 causes the adjusting rod 40 to move longitudinally relative to the entrance section 12 and thus, simultaneously turns all of the roller tables 28 to adjust to the skew angle of the rollers 34 in the entrance section 12 and in the inspection station 13.

Motors 45 are secured to the bases of the entrance section and the inspection station near each propelling assembly 25 and include drive shafts 46 which are coupled to the extended shaft portions 36 of the roller shafts 35 and drive them through the extensible drive shaft 37. The extensible drive shafts 37 include internally and externally splined members 47, 48, respectively, which telescoped to accommodate for changes in the distance between the rollers 34 and the motor shafts 46 when the skew angle of the rollers 34 is changed by the adjusting wheel 43. The extensible shafts 37 are coupled on each end to the roller and motor shafts 35, 46 by universal couplings 49 to accommodate non-alignment of the roller and motor shafts 35, 46.

Guide members 51 are carried by the base plate 21, and are disposed in spaced parallel relation on each side of the path of travel of the workpiece 18. The guide members 51 extend throughout the entrance section 12 and are movable laterally to adjust for various widths of workpieces. A mechanism (FIGURES 6, 8, and 9) in the form of camming bolts 52 which are fixed to the guide members 51 and are disposed in diverging camming slots 53 in the base plate 21 is provided to move the guide plates 51 laterally when an adjusting wheel 54 is rotated to longitudinally move the guide members 51 by a threaded rod 55 connected to the guide members 51.

Referring to FIGURES 1, 4, and 7, hold down assemblies 56 are provided over each of the propelling roller assemblies 25 at spaced stations along the entrance section. Each hold-down assembly 56 is carried by the base plate 21 and clamps and holds the workpiece 18 between the guides 51 and against the skewed propelling rollers 34. Each hold-down assembly 56 includes a pneumatic cylinder 57 mounted directly over the line of workpiece travel, a roller mount and support 58 connected to the piston rod of the pneumatic cylinder 57 and a pair of idler rollers 59, 60 carried by each of the mounts 58. Activation of the hold-down cylinders 57 is controlled by their respective solenoid actuated air valves 61–64.

The hold-down rollers 59, 60 is swiveled in the support 58 and held against the workpiece 18 turn freely and follow the angle of helical movement of the traveling workpiece 18. Each hold-down cylinder 57 is supported by a pair of support posts 65 and support arms 66. The arms 66 are each pivotally connected at one end to the top of a support post 65 and at the other end to a vertical support plate 67 to accommodate the floating action of their respective float plate 26 on which the support posts 65 are carried. Each hold-down roller mount 58 is connected to tubular guides 68 which are slidable on the support posts 65 and prevent the roller mount 58 from twisting.

A plurality of bridge supports 70 are fixed to the entrance section base plate 21 and are substantially aligned with the inclined rack members 17 of the feed rack assembly 11. Inclined members 71 of the bridge supports 70 are spaced from the ends of the rack members 17 and slant downwardly from just above the rack members 17 to just above the workpiece guides 51 of the entrance section 12. A plurality of workpiece lift arms 72 are fixed to a lift shaft 73 which is rotatably journaled in the bridge support 70. The lift arms 72 bridge the space between the rack members and the inclined bridge members 71. A lift cylinder 74 is secured to the entrance section base 20 and includes a piston rod 75 which is pivotally connected to a lever 76. The lever 76 is fixed to the lift shaft 73 and rotates the shaft 73 when the cylinder is actuated by a control valve 77. The arrangement of the control valve 77 and the lift cylinder 74 is such that when the solenoid 77s of the control valve 77 is electrically energized the lift cylinder 74 is actuated to move the lift arms 72 to their down positions shown in solid in FIGURE 7 and when the solenoid 77s is de-energized, to raise the lift arms to their up positions shown in phantom.

Limit switches 95–98 are fixed to the base 20 of the entrance section and include actuator arms 95a–98a which extend up between the guide members 51 and are engaged and moved by the workpiece as the workpiece enters the space between the guide members and falls onto the propelling rollers 34. Limit switch 95 is shown in FIGURE 6.

The actuator arms 95a–98a are located ahead of their respective hold-down assemblies 56 as shown in FIGURE 4. Normally open contacts 95c–98c (see FIGURE 17) of the switches 95–98 are electrically connected to the solenoids 61s–64s respectively and cause their respective solenoids to be energized when the contacts are closed by a workpiece engaging and moving the actuator arm of that switch. Thus, the hold-down rollers of each hold-down station engages the workpiece only if the workpiece is between the guides at that particular station. As shown in FIGURE 4, the workpiece 18 on the propelling rollers 34 has actuated switches 95–97 to bring down their respective hold-down rollers and won't actuate switch 98 to bring down its respective hold-down rollers until the workpiece travels forward and engages the actuator arm 98a.

The workpieces 18′, 18″, etc., stored on the feed rack members roll because of gravity toward the entrance section 12. The first workpiece 18′ in the group of workpieces abuts the end of the inclined bridge members 71 which act as stops. When no workpieces are on the rollers 34 in the entrance section, the lift cylinder 74 rotates the lift arms to lift the workpiece 18′ to the inclined bridge member 71. The lifted workpiece 18′ rolls by gravity across the guides and onto the propelling rollers 34 moving at least some of the actuator arms 95a–98a and thereby causing the corresponding hold-down rollers to descend and hold the workpiece against the propelling rollers 34. The propelling rollers 34, because of their skew, impart a rotation to the workpiece, as well as propelling it longitudinally through the entrance section. The degree of skew of the rollers 34 determines the amount of lineal travel for each complete revolution of the workpiece. In the example used for purposes of illustration herein, the skew of the rollers is such as to provide three inches of lineal travel per revolution. The units of lineal travel per revolution are therefore adjusted by changing the angle of the rollers 34 by means of the adjusting wheel 43. As the workpiece rotates and travels longitudinally, the swivel mounted hold-down rollers 59, 60 engaging the workpiece align themselves so as to follow the resultant movement of a point on the surface of the helically moving workpiece.

Figure 9:
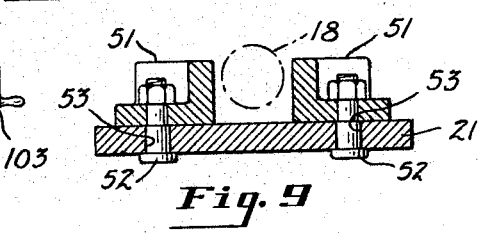
FIGURE 9 is a section view taken along line 9—9 in FIGURE 8.
Figure 10:
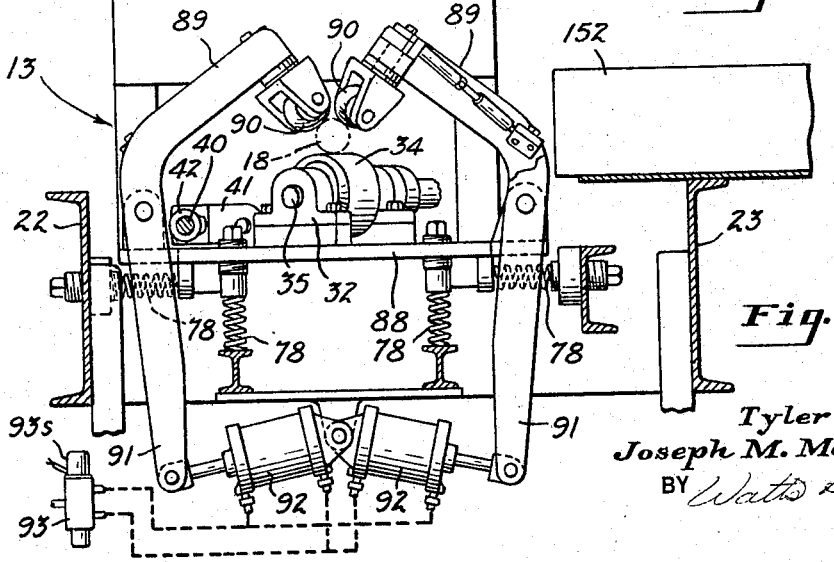
FIGURE 10 is an end, elevational view of the workpiece propelling assembly shown in FIGURE 8.

Referring to FIGURES 8 and 10 the inspection station 13 includes two propelling assemblies 25 which are both carried on a single large float plate 88 carried on horizontal and vertical springs 78. A pair of hold-down arms 89 with swiveled rollers 90 are carried by the float plate 88 and are provided over each of the propelling rollers 34 in the inspection station 13. The hold-down arms 89 are pivotally carried by the float plate 88 and include lever arm extensions 91 which are pivoted by the piston rods of cylinders 92. A solenoid actuated control valve 93 is connected to the cylinders 92 and actuates the cylinders to move their respective hold-down rollers against the workpiece when a solenoid 93s of valve 93 is electrically energized.

The float plates 26, 88 are each mounted for independent movement so that workpieces which are not preferably straight may be propelled in constant adjacent relation to the fixed probe coil. Each hold-down station formed by the propelling and hold-down assemblies 25, 56 and by the hold-down arms 89 with the probe 104 between the arms is carried by a separate float plate and will move in all the directions necessary to follow a bend or camber of the workpiece as it travels. Even those workpieces classified as "straight" may have as much as one quarter inch of camber per five feet. Because of this camber even in the so-called "straight" workpieces, prior to the present "floating" type of workpiece propelling and supporting assemblies it has been necessary to run each workpiece through a straightener prior to running it past a fixed search probe to inspect it for defects.

Referring to FIGURES 10–13, an inspection and marking assembly support frame 101 is positioned between the hold-down arms 89 and is carried by the float plate 88. A probe and marker carriage 102 is slidably carried by the support frame 101 and is vertically adjustable in the support frame 101 by means of a hand crank and screw assembly 103 to accommodate different size workpieces. The search probe 104 is carried by a probe positioning shaft 105 which is attached to the piston rod of a probe positioning cylinder 107. The shaft 105 is vertically moved along its longitudinal axis within guide bushings 106 carried by the carriage 102. A pin 80 protrudes laterally from the shaft 105 and is slidably disposed in a vertically arranged slot 81 to prevent rotation of the shaft 105 regardless of its vertical position. A solenoid actuated control valve 109 is pneumatically connected to the cylinder 107 and controls actuation of the cylinder to extend and retract its piston rod to position the probe 104 against and spaced from the workpiece 18, respectively.

A gimbal assembly 82 connects the search probe 104 to the end of the shaft 105. The gimbal assembly 82 includes a positioning housing 83 fixed to the end of the shaft 105, an outermost floating housing 84, an intermediate floating housing 85 and an intermost floating housing 86 which contains the search probe 104. The housings 83–86 are partially nested one within the other as shown. Fasteners 87 are attached to the intermediate housing 86 and slidably disposed within longitudinal slots 87s in the positioning housing 83 to permit movement of the outermost housing 86 relative to the positioning housing 83. A fastener 117 interconnects the outermost housing 84 and the intermediate housing 85 to permit relative rotation of the housings 84, 85 about an axis parallel to the path of workpiece travel. Fasteners 118 interconnect the intermediate housing 85 and the intermost housing 86 to permit relative rotation of the housings 85, 86 about an axis transverse to the path of workpiece travel and to the axis of relative rotation of the housings 84, 85. In the arrangement shown, the search probe housing 86 is free to move universally at the end of the positioning shaft 105. Springs 108 are interposed between the positioning housing 83 and the outermost housing 84 to bias the outermost housing 84 away from the positioning housing 83 and to provide a spring bias against which the floating housings 84–86 ride on the moving workpiece.

A workpiece presence detecting switch 100 having an actuator arm 99 is carried by the carriage 102. The actuator arm 99 is disposed in the travel path of the workpiece 18 and is engaged by and moved by a workpiece entering the inspection station to actuate the switch 100.

A marker assembly 110 is also carried by the adjustable carriage 102. The marker assembly includes a motor 111 which is pivotally carried by the carriage and a carbide cutter 112 which is fixed to the shaft of the motor 111 and is disposed over the workpiece 18. A spring 113 biases the cutter 112 in spaced relation out of engagement with the workpiece 18. A cylinder 114 is carried by the carriage 102 and has a piston rod connected to a shaft collar 115 at a point just above the cutter 112 and causes the cutter 112 to engage the workpiece each time the cylinder 114 is activated by a suitable control such as a solenoid actuated air valve 116.

Although only one inspection station 13 is shown, it is to be understood that a plurality of such stations may be provided. For example, a plurality of inspection and marking assemblies may be spaced longitudinally along the path of workpiece travel at the end of the entrance section 12 or they may be spaced along the entrance section 12. With a plurality of longitudinally spaced inspection stations, each station inspects only a portion of each workpiece and all of the assemblies together inspect the entire workpiece.

Referring to FIGURES 1, 2, and 3, the exit section 14 includes a base 121, idler rollers 122 and a pair of drive rollers 123 carried by the base. Exit section drive motors 119 rotate the drive rollers 123 through a suitable drive such as a chain and sprocket drive 120. Exit lift arms 124 are fixed to an exit lift shaft 125 which shaft is rotatably carried by the exit base 121. An inclined exit bridge member 126 is carried by the base 121 and slants downwardly from adjacent and above the path of workpiece travel to the cradle assembly 15. A lift cylinder 127 is connected to the exit base 121 and has a piston rod pivotally connected to a lever arm 128 which arm 128 is fixed to the exit lift shaft 125 to rotate the shaft 125 to raise the lift arms 124 and thereby lift the workpiece onto the inclined exit bridge member 126 when the cylinder is properly actuated by a solenoid actuated control valve 129. The arrangement of the cylinder 127 and the control valve 129 is such that when a solenoid 129s of the control valve 129 is electrically energized the cylinder 127 is actuated to raise the lift arms 125.

Referring to FIGURES 1, 3 and 5, the cradle assembly includes four bins or cradles A–D formed by upright bin members 135. Inclined members 136 are secured to the tops of the upright members 135 and bridge the upright members between each of the bins A–D. Gate members 137–139 extend across the top of the bins A–C respectively at the sides and middle of the cradle assembly. The gate members 137–139 are fixed to shafts 140–142 respectively and rotate with their respective shafts between a raised or open position (FIGURE 5) and a lowered or closed position (FIGURE 3). The gate members 137–139 in their closed positions are inclined in an overlapping relation to the inclined members 136 and define a continuous inclined rack with them so that workpieces placed on the cradle assembly will move as by rolling along the cradle assembly by gravity and fall into the first bin of the bins A–C that is open or into bin D if none of the gate members 137–139 is raised.

Lever arms 143–145 have one end fixed to the shafts 140–142 respectively. Pneumatic cylinders 146–148 are pivotally secured to the cradle assembly base and have piston rods pivotally connected to the other ends of the lever arms 143–145 to raise and lower the gate members 137–139 when the cylinders 146–148 are suitably actuated. Solenoid actuated control valves 149–151 are pneumatically connected to the cylinders 146–148 and each activates its respective cylinder to raise its respective gate member when its respective solenoid of solenoids 149s–151s is electrically energized.

Referring again to FIGURE 1, a control center 152 is positioned adjacent the inspection station 13. The control center 152 includes the following control units.

(1) A detector unit 153 for producing defect signals which are proportional to the magnitude of defects detected by the probe 104.

(2) A classifier control unit 154 for examining the defect signals produced by the detector circuit 153 and for separating the defect signals according to defect depth or severity.

(3) A marker control unit 155 to control operation of the carbide cutter cylinder 114 so that the cutter marks the location of each material defect in the workpiece.

(4) An analyzer control unit 156 which analyzes the defect signal information from the classifier unit 154 and then classifies the workpiece as either good, salvage, or scrap according to its defect severity.

(5) A motor control unit 157 for controlling energization of motors.

(6) An overall control unit 158 for co-ordinating the operation of the above control units 153–156, the entrance section 12, the inspection station 13, the exit section 14, and the cradle assembly 15.

Figure 14:
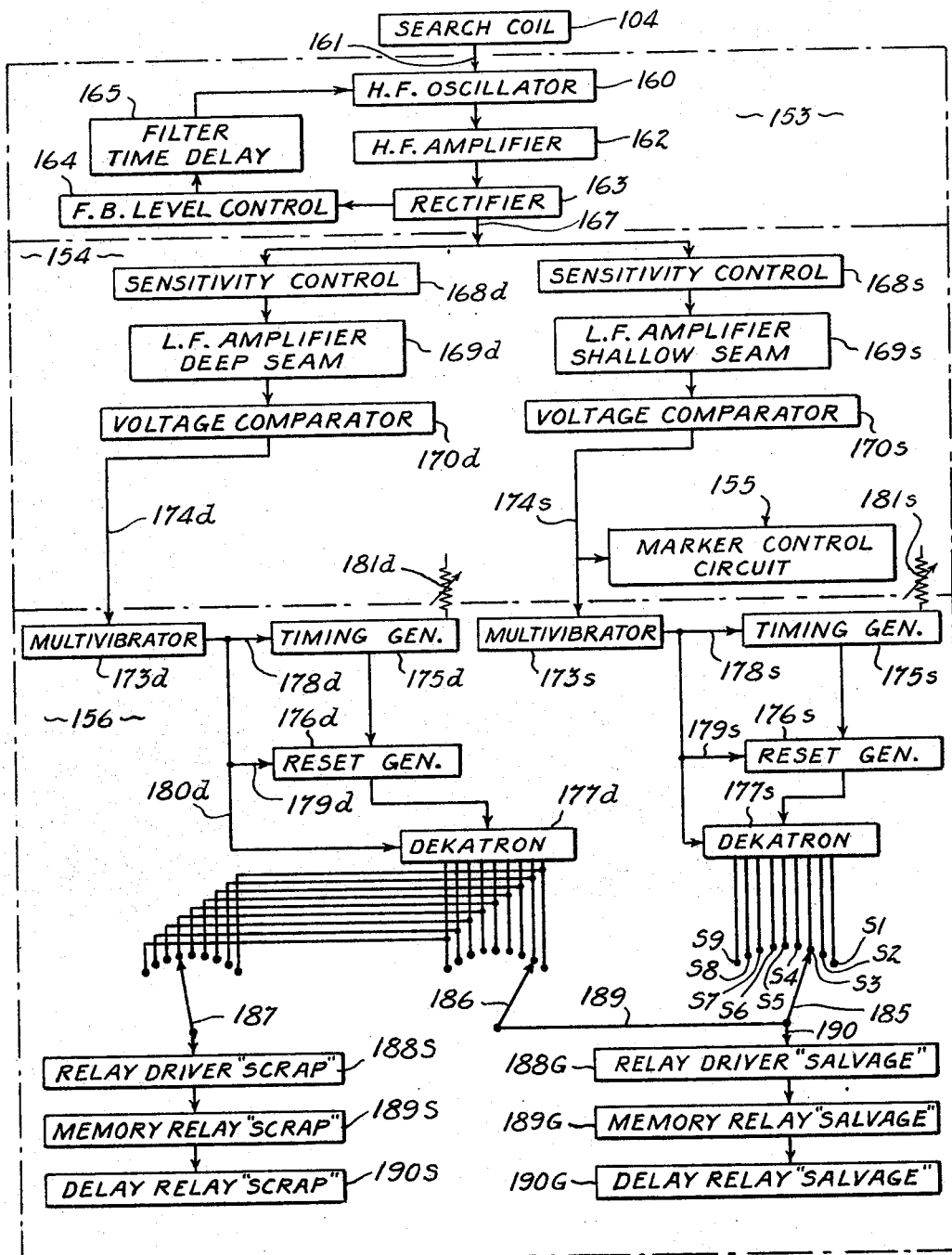
FIGURE 14 is a block diagram of the control units located in the control center at the inspection station.

A block diagram of the detector unit 153, the classifier 154, and the analyzer unit 156 is presented in FIGURE 14. As shown in FIGURE 14, the output of the probe search coil 104 is connected to the input of the detection control unit 153 which is an oscillator high frequency unit. The details of the detection control unit 153 are explained fully in Patent No. 2,832,040, issued to William C. Harmon and will only be briefly described below.

The search coil 104 is connected to a high frequency oscillator 160 by means of a cable 161 and constitutes a primary frequency determining element for the oscillator 160. As described in the above referenced patent, the oscillator 160 includes two separate stages, an amplifier stage and a feedback stage, so that separate control of feedback may be obtained. High frequency alternating voltages generated by the oscillator are transmitted to a high frequency amplifier 162. The alternating voltages at the output of the amplifier 162 are transmitted to a rectifier 163 and the rectified voltages at the output of the rectifier 163 are returned to the oscillator 160 through a feedback level control 164 and a filter time delay 165. The rectified voltages are utilized to bias the feedback stage of the oscillator 160 in order to maintain the amplitude level of the oscillations substantially constant except for changes produced when a flaw or defect such as a seam is encountered as the workpiece 18 moves relative to the search coil 104. The filter 165 functions as an integrating device so that only voltage impulses of greater than a predetermined duration are imparted to the oscillator 160 while the feedback level control functions as a means for controlling the amplitude of the feedback voltage. The output of the detection unit 153 is a bi-polar wave form the amplitude of which is approximately proportional to the depth of the defect or seam in the workpiece. This wave form is fed into the low frequency classifier unit 154 via a line 167.

The low frequency classifier unit 154 contains two channels, a shallow defect channel and a deep defect channel. The deep defect and shallow defect channels are very similar in construction and operation and each consist of a sensitivity control 168d, 168s, a low frequency amplifier 169d, 169s, and a voltage comparator 170d, 170s, respectively. The function of the voltage comparators 170d, 170s is to produce fast-rise pulses which are required to operate subsequent units in the defect analyzer unit 156 at a certain fixed voltage level on the input wave form. Each comparator unit 170d, 170s produces an output pulse when the input to the classifier unit exceeds a certain threshold level. The threshold level of the deep defect channel comparator unit 170d is higher than that of the shallow defect channel comparator unit 170s so that the deep defect channel produces an output pulse for deep defects only and the shallow defect channel produces an output pulse for both shallow and deep defects. The outputs of the voltage comparators 170d, 170s are introduced into the inputs of corresponding shallow defect and deep defect channels in the defect analyzer unit 156. The output of the shallow defect voltage comparator 170s is also introduced into the marker control circuit 155 which in turn actuates the marker cylinder 114 to cause the carbide cutter to engage and mark the workpiece for each defect detected. The details of the marker control circuit 155 and the marking apparatus are more fully explained in a co-pending application Serial No.

271,788, filed April 9, 1963, by Tyler W. Judd and Joseph M. Mandula, Jr., now Patent No. 3,180,230.

The function of the analyzer unit 156 is to act upon the shallow and deep defect signals and then produce energizing signals for introduction to the main control unit 158 which in turn operates the proper gate member in the cradle assembly 15 to separate the workpieces into groups of grind, or scrap workpieces. Those workpieces which are neither "salvage" nor "scrap" are classified as "good" and are placed in a third group.

Each shallow defect signal introduced to the analyzer unit 156 from the shallow defect voltage comparator 170s is fed to the input of a single shot multivibrator 173s via the line 174s. The single shot multivibrator 173s produces a trigger signal pulse of predetermined duration for each defect signal received at its input. The trigger signal from the single shot multivibrator 173s is introduced to the inputs of a timing generator 175s, a reset generator 176s, and a Dekatron counter 177s, via the lines 178s, 179s and 180s, respectively. The timing generator 175s produces a saw-tooth voltage having an adjustable duration. A variable time control 181s is provided to set the voltage duration to slightly greater than the time required for one revolution of the bar or workpiece depending upon the diameter or size of the workpiece being inspected. Although the timing generator 175s runs continuously, its zero time is made coincident with each input trigger signal from the multivibrator 173s. In other words, each time the timing generator 175s receives an input trigger signal, it again starts a timing cycle regardless in what portion of the timing cycle it was previously situated. At the end of a complete timing cycle, the timing generator 175s introduces a reset signal to the reset generator 176a for resetting the Dekatron 177s as is explained below. The function of the reset generator 176s is to prevent resetting of the Dekatron 177s during the time that the timing generator 175s is being reset to zero time. This assures that the only time that the Dekatron 177s is reset to zero is at the completion of the timing cycle of the timing generator 175s.

The Dekatron counter 177s includes a plurality of cathode outputs indicated by the reference characters S–1 through S–9. A selector switch is selectively positioned at one of the Dekatron outputs S–1 through S–9. Initially, when the Dekatron 177s is zeroed, no voltage signal appears at any Dekatron output. When a shallow defect trigger pulse is introduced to the input of the Dekatron counter 177s via the line 180s a voltage signal appears on the first Dekatron output S1. Each additional shallow defect trigger pulse introduced to the input of the Dekatron counter 177s advances the voltage signal one position on the Dekatron outputs S1–S9. For example, if a total of four defect trigger pulses have been introduced into the input of the Dekatron counter 177s, then the voltage signal would appear at the Dekatron output S4. The voltage signal appearing at the Dekatron outputs will continue to advance one output position for each defect trigger pulse received at its advance input until it is reset by a signal from the reset generator 176s which means that the timing generator 175s has gone through an entire timing cycle. In other words, the timing generator 175s does not produce a reset pulse to reset the Dekatron 177s as long as it receives an input trigger pulse before the termination of a timing cycle initiated by a previous trigger pulse.

The deep defect channel of the analyzer unit 156 is substantially identical in construction and operation to the shallow defect channel. The voltage output of a Dekatron counter 177d of the deep defect channel advances one terminal position for each deep defect trigger pulse received before being reset by a reset pulse from a timing generator 175d.

"Salvage" selector switches 185, 186 are movably positioned at a selected one of the output terminals of the shallow defect and deep defect Dekatron counters 177s, 177d respectively. A "scrap" switch 187 is positioned at one of the output terminals of the deep defect Dekatron counter 177d only. A relay driver 188 is connected to the selector switches 185, 186 via lines 189, 190 and produces a relay energizing signal whenever a voltage signal appears at one of the terminals to which either the switch 185 or the switch 186 is positioned. The relay energizing signal produced by the relay driver 188G is introduced to a memory relay circuit 189G. The memory relay 189G circuit in effect retains the energizing pulse information until the workpiece is clear of the testing section 13. The energizing signal is then effectively transferred to a delay relay 190G which opens the appropriate gate in the cradle assembly 15 and keeps this gate open until the workpiece has been deposited in the group of workpieces which are classified as "salvage."

The "scrap" selector channel is very similar to the "salvage" selector channel just described. A "scrap" relay driver 188S is connected to the "scrap" selector switch 187 and produces an energizing pulse whenever a voltage signal appears at the Dekatron terminal to which the selector switch 187 is positioned. This energizing pulse is retained by a memory relay circuit 189S until the workpiece is clear of the testing section 13 and then in effect transfers the energizing pulse to a delay relay 190S which opens the "scrap" gate and keeps it open until the workpiece is in the scrap bin.

The "salvage" selection may be for any desired number of continuous deep or shallow defect indications whichever occurs first. As shown in FIGURE 13, typical "salvage" settings might be two deep defect indications or three shallow defect indications. The "scrap" selection is made for the desired number of deep defect indications only, typically six as is shown in FIGURE 13.

*Details of low frequency classifier unit 154*

Figure 15:
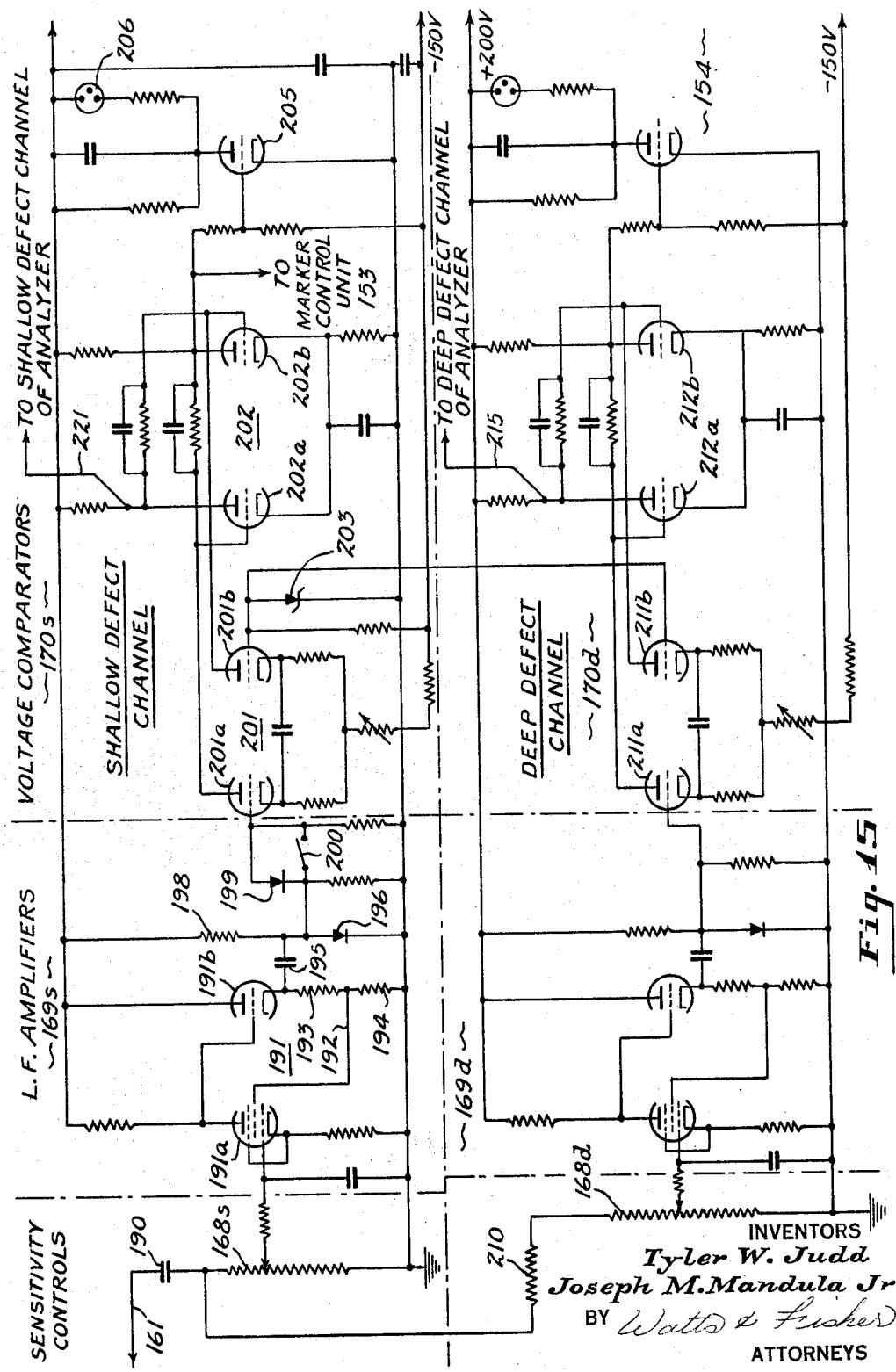
FIGURE 15 is a circuit diagram of a classifier control unit shown in FIGURE 14.

Referring to FIGURE 15, the signal from the detection control unit 153 is applied through a capacitor 190 to the two sensitivity controls 168d, 168s. Adjustment of these sensitivity controls 168d, 168s effectively changes the amplification of their respective channels. This in turn determines the input amplitude which is required to cause operation of their respective voltage comparators 170d, 170s and, hence, the outputs from the classifier unit.

In the shallow defect channel, the pentode section of a vacuum tube 191 is connected as a conventional amplifier to form the low frequency amplifier 169s. The pentode section 191a is direct-coupled to the triode section 191b of the same vacuum tube 191. The triode section 191b functions as a cathode follower. A screen grid voltage for the pentode section 191a is obtained from a tap 192 on the cathode resistors 193, 194 of the triode section 191b. This provides a low impedance source of screen grid voltage and also provides negative feedback which stabilizes the gain of the amplifier. The output of the low frequency amplifier is taken from the cathode of the cathode follower section through a capacitor 195. This output is clamped by a diode 196 so as to be uni-polar in the negative going direction. A resistor 198 provides a small bias current through the diode 196 causing it to operate in a more linear region. A diode 199 is connected in series with a grid of a tube section 201a to suppress small signals, i.e., those of insufficient amplitude to cause diode conduction. This diode 199 may be shorted out of the circuit, if desired, by means of a switch 200.

The tube section 201a and tube sections 201b, 202a and 202b of dual triode tubes 201, 202 comprise the voltage comparator 170s. As explained previously, the purpose of the voltage comparator 170s is to produce the fast-rise pulses which are required to operate the analyzer control unit 156 when a predetermined voltage level appears at the input of the comparator 170s.

The first dual-triode vacuum tube 201 operates as a difference amplifier. A negative reference voltage is supplied to the grid of the tube section 201b by means of a zener diode 203. The voltage at the grid of the tube section 201a is approximately zero in the absense of an input signal. Because of the difference in grid voltages, the voltage at the plate of tube section 201a normally will be lower than the voltage at the plate of section 201b.

The second dual-triode vacuum tube 202 is connected as a Schmitt trigger and is direct-coupled to the plates of the first dual triode 201. The Schmitt trigger consists of the two triode sections 202a, 202b each having both a D.C. plate to grid and a cathode to cathode coupling between sections. The circuit has two stable states; the tube section 202b fully conducting and the tube section 202a cut off, and the tube section 202a fully conducting and the tube section 202b cut off. The circuit will remain in either stable state until driven to the switching point by the difference amplifier comprised by the tube 201. The voltage levels at the grid of the tube sections 202a, 202b determine in which state the circuit will normally be situated. The conditions here are such that the tube section 202b is normally conducting and the tube section 202a is normally cut off. As a negative going input is applied to the grid of tube section 201a of the difference amplifier, the grid of tube section 202a of the Schmitt trigger swings more positive. At the same time the grid of tube section 202b of the Schmitt trigger is driven in the negative direction by the tube section 201b of the difference amplifier. As this situation progresses, a grid voltage will be reached which will cause the tube section 202a of the Schmitt trigger to conduct. When this section begins to conduct, its plate voltage drops which in turn drops the grid voltage of the tube section 202b and cuts it off. As the tube section 202b cuts off, its cathode voltage goes more negative. Since the cathodes are direct-coupled, this constitutes a positive feedback and further drives the tube section 202a into conduction until plate saturation is reached. This action is very rapid and when completed, the Schmitt trigger is in the opposite stable state. It will remain in this state until the voltage level of the grid of tube section 202a is moved negatively beyond the threshold voltage.

Output defect signals are taken from both plates of tube sections 202a, 202b comprising the Schmitt trigger. The output from the plate of tube section 202a is a negative going pulse and is introduced into the shallow defect channel of the analyzer control unit 156 via conductor 221. The output from the plate of the tube section 202b is a positive going pulse and is introduced into the marker control circuit 155. The positive going pulse from the plate output of tube section 202b is also used to operate a tube section 205 which controls a neon defect indicator lamp 206.

The construction and operation of the deep defect channel is very similar to the shallow defect channel. A resistor 210 is connected in series with the sensitivity control 168d for this deep defect channel in order to reduce the effective amplification. No series diode is provided at the grid of a difference amplifier section 211a in the deep defect channel because the higher signal level here does not require it. In addition, only one defect trigger signal is taken from the Schmitt trigger formed by tube section 212a, 212b in the deep defect channel. This single output is from the plate of tube section 212a via conductor 215 and supplies a negative going pulse which is used to operate the deep defect channel of the analyzer control unit 156.

It should be noted that the amplitude of the output defect pulses from the low frequency classifier unit 154 are independent of the amplitude or wave shape of the input signals provided that the input signals exceed the predetermined threshold level. It should also be remembered that the shallow defect channel will provide an output defect signal for both shallow and deep defects whereas the deep defect channel will provide a defect signal for deep defects only.

Details of analyzer control unit 156

Figure 16:
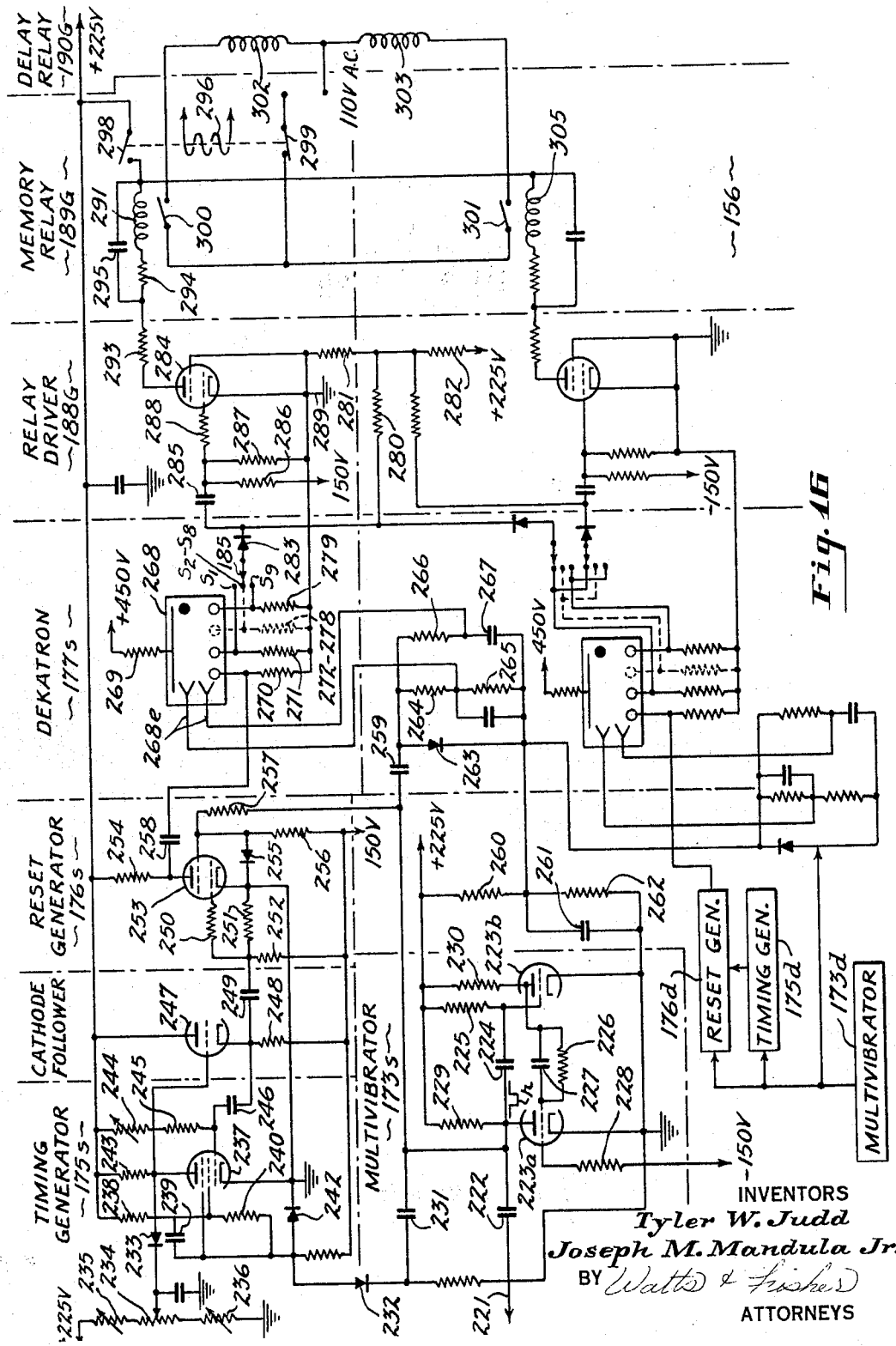
FIGURE 16 is a circuit diagram of an analyzer control unit shown in FIGURE 14.

Referring to FIGURE 16, the shallow seam section of the defect analyzer unit is shown in detail. Since most of the circuitry for the shallow defect and deep defect channels of the defect analyzer are substantially identical, only the shallow seam channel is fully shown and described.

The negative going output pulse produced by the bar classifier 154 each time a defect in excess of a specified level is detected is introduced to the shallow seam channel of the analyzer unit 156 via the conductor 221 through a capacitor 222 to the plate of a triode section 223a. Triode sections 223a and 223b form the conventional plate-coupled monostable multivibrator 173s. The period of the multivibrator 173s is determined by a capacitor 224 and a resistor 225 and in the example used in the present description is adjusted to be equal to about 10 milliseconds. The exact period is not of extreme importance. It must only be long enough to allow activation of the Dekatron counter 177s and recovery of the timing generator 175s. Resistors 229, 230 are plate load resistors and connect the plates of the tube sections 223a, 223b to a positive 225 volt power supply. The plate of tube section 223b is coupled to the grid of tube section 223a via a resistor 226 and a capacitor 227. The resistor 226 together with a grid resistor 228 provide proper bias for the tube section 223a.

The output of the monostable multivibrator 173s is a negative going rectangle taken from the plate of tube section 223a. This output voltage serves three functions; namely:

(1) The negative going output voltage is fed via a capacitor 231 and a diode 232 to the suppressor grid of a vacuum tube 237. The vacuum tube 237 functions as the timing generator 175s. The presence of a negative pulse at its suppressor grid causes the vacuum tube 237 to revert to he beginning of its timing cycle.

(2) The negative going output voltage is applied through a resistor 257 to a shield grid of a thyratron tube 253. This is a gating function and serves to disable the tube 253 of the reset generator 176s during the interval that the monostable multivibrator 173s is in operation.

(3) The negative output voltage is fed through a capacitor 259 to a network comprising a diode 263, resistors 264, 266 and a capacitor 267. This network produces the attenuation and the phase shift required to drive a Dekatron tube 268 in the Dekatron counter 177s and to advance the Dekatron tube 268 one position for each impulse received. The lower end of this network formed by circuit elements 263–267 is returned to a positive potential as established by a resistor 260, a resistor 262, and a capacitor 261 which are connected to the positive 225 volt power supply. This positive potential biases guide electrodes 268e of the Dekatron tube 268 so that advancement of cathode output voltage can take place. Thus, each time the monostable multivibrator 173s operates, the Dekatron tube 268 is advanced one cathode position.

The timing generator 175s includes the vacuum tube 237 connected as a screen coupled phantastron. The circuit is conventional except that the value of bias voltage applied to the suppressor grid of tube 237 has been chosen so as to allow the stage to run free. Basically, the phantastron is a Miller sweep circuit except that it employs regenerative switching at the end of the sweep. This is due to the coupling between the screen grid and the suppressor grid of the tube 237. When the phantastron circuit begins to function, the plate current flows and the plate voltage drops. The drop in plate voltage of the tube 237 causes a corresponding drop in the control grid voltage because of the coupling between the plate and the control grid effected by a cathode follower tube 247 and a capacitor 246. The lowering of the grid voltage reduces the cathode current and thereby causes a reduction in the screen grid current and a rise in the screen grid voltage. The rise in screen grid voltage is coupled to the suppressor grid of tube 237 through a resistor 240 and a capacitor 239. As a result of this action, the suppressor grid voltage is increased until it is clamped by means of a diode 242. The plate voltage of the phantastron tube 237 drops only a few volts below the supply voltage before the grid voltage is lowered almost to cutoff. Capacitor 246 discharges through a timing resistor 245 and a potentiometer 244. The voltage at the grid of tube 237 rises because the capacitor 246 is discharging and the plate voltage of the tube 237 is reduced. As a result of the feedback between the plate and the grid, the capacitor 246 has an effective value which is much larger than its actual value. For this reason, the current through the timing resistor 245 and the potentiometer 244 remains very nearly constant and provides a nearly constant rate of discharge of the capacitor 246 and a very linear decrease in plate voltage as a function of time.

This action continues until the plate voltage of tube 237 can no longer decrease with increasing control grid voltage. At this time there is a sudden increase in the screen grid current, a drop in the screen grid voltage, and a drop in the suppressor grid voltage which reduces the plate current and causes the plate voltage to rise. In this circuit the suppressor grid voltage is not allowed to reach cutoff value; therefore, the phantastron will run free.

The duration of the saw-tooth generated at the plate of the vacuum tube 237 is dependent largely upon the time required for its plate voltage to run down. If the potential to which the plate is returned is made equal to some reference potential, then the plate run-down will always start from the reference potential and the duration of the saw-tooth voltage will be directly proportional to the reference potential. In this circuit, the reference voltage is obtained from a potentiometer 234 which is connected to the positive voltage supply 225 volts via a potentiometer 235 and to ground via a potentiometer 236. The plate of the vacuum tube 237 is clamped to the reference voltage by means of a diode 233.

As has been previously described, the application of the negative voltage to the suppressor grid of the vacuum tube 237 causes the initiation of a timing cycle regardless of what portion of a timing cycle the tube is previously situated. Thus, the beginning of any timing cycle is made coincident with the leading edge of the output rectangle (r) from the plate of tube section 223a. This in turn is coincident with the input pulse introduced from the classifier 154 by conductor 221. The time control adjustment is set so that the run down time of the phantastron timing generator 175s is slightly longer than the time required for one revolution of the bar or other workpiece. This assures that all defects presented during one revolution are properly registered.

The cathode follower 247 is provided to improve the recovery of the phantastron. With this follower section, the capacitor 246 is recharged via a low output impedance of the cathode follower stage 247 thus reducing the recovery time to a low value. A resistor 248 is provided as a cathode load resistor.

The reset generator 176s includes the thyratron tube 253 and a capacitor 258 connected between the plate of the thyratron tube 253 and a cathode resistor 270 of the Dekatron tube 268. The capacitor 258 charges through a resistor 254 from the 225-volt positive power supply. When the thyratron 253 conducts the capacitor 258 is discharged through the resistor 270 which is connected to the zero cathode of the Dekatron tube 268. The resultant negative voltage developed across the resistor 270 causes the cathode glow or spot to shift to the zero cathode regardless of its previous position. Normally, the shield grid of the thyratron 253 is clamped to ground potential because of the action of a diode 255 and resistors 256, 257. A positive going voltage is applied to the control grid of the thyratron 253 via a capacitor 249 whenever the phantastron commences its recovery. Resistors 251, 252 provide the proper bias voltage for the thyratron 253. A resistor 250 limits the grid current of the thyratron 253. The resistor 257 connected between the shield grid of the thyratron 253 and the plate of the tube section 223a causes the shield grid of the thyratron 253 to go negative during the period of monostable multivibrator 173s. This prevents conduction of the thyratron 253 during the time that the timing generator 175s is being reset to zero time. Hence, the only time that the Dekatron 177s is zeroed is at the completion of a timing cycle.

In the Dekatron counter circuit 177s, the cathodes of the Dekatron tube 268, other than the zero cathode, are all connected to ground through the resistors 271–279. The cathode resistors 271, 279 are shown in solid and the cathode resistors 272–278 are represented by the single resistor shown in phantom. When the cathode glow or spot is established at a cathode, a voltage is developed across the corresponding cathode resistor. A resistor 269 is connected from the plate of the Dekatron counter tube 268 to a positive 450-volt power supply and limits the current through the Dekatron tube 268. The contact terminals S1–S9 are connected between the cathodes and the cathode resistors 271–279 respectively. Resistors 280–282 bias a diode 283 so that it is non-conducting except when the cathode to which it is connected through the selector switch 185 becomes energized. Each time the input guides 268e of the Dekatron counter tube 268 receive an input pulse from the monostable multivibrator 173s, prior to being reset at the completion of a timing cycle as determined by the timing generator 175s, the cathode glow or Dekatron spot advances one cathode position. A workpiece is therefore classified on the basis of the number of defect counts that the Dekatron 177s accumulates before it is reset to zero.

In the relay driver circuit 188G, when the diode 283 conducts, a postive pulse is applied to the grid of a thyrathron tube 284 via a coupling capacitor 285 and the thyrathron 284 then fires. A resistor 287 connected between the grid of the thyratron 284 and a ground connection 289, and a resistor 286, connected between the grid of the thyratron 284 and a negative 150 volt supply, maintain a proper bias voltage on the grid of the thyratron 284. A resistor 288 limits the grid current of the thyratron 284.

In the memory relay circuit 189G, the coil 291 of the memory relay is connected between the positive 225 volt supply and the plate of the thyratron tube 284 via a contact 298 and opens its contact 299 whenever a bar or itor 295 is connected in parallel with the relay coil 291 and the resistor 294 to provide a time delay release of the memory relay. The coil 296 is energized and closes its contact 298 and opens its contact 299 whenever a bar or other workpiece is present in the testing section 13 as is explained below in connection with the overall control unit 158.

When the thyratron 284 conducts because a selected number of defects have been counted by the Dekatron tube 268 within one timing cycle, the memory relay coil 291 is energized. The resistor 293 limits the current through the thyratron 284. As soon as the relay coil 291 is energized, its contact 300 closes. However, as will be explained more fully below, at this time the contact 299 is open because a workpiece is in the testing section 13 and a coil 302 of the time delay relay 109G is not energized. As soon as the bar or workpiece clears the testing section 13, the relay coil 296 is de-energized and the contact 298 opens while the contact 299 closes.

With the contact 298 open, the thyratron 284 is de-energized. However, the relay contact 300 is not released immediately because the energy charge stored by the capacitor 295 maintains the coil 291 energized. The contact 300 thus remains closed while the contact 299 is also closed energizing the coil 302 of the time delay relay 190G. After a time of about preferably one second, the capacitor 295 has discharged sufficiently to de-energize the relay coil 291 and the contact 300 opens. Since the time delay relay coil 302 has already been energized at this time, the delay relay 190G has started its timing cycle which is sufficient to allow the workpiece to roll into the cradle bin corresponding to its classification.

To summarize operation of the defect analyzer unit 155 it is to be noted that each shallow defect input advances the cathode spot of the shallow defect Dekatron by one position and each deep defect input advances the cathode spot of the deep defect Dekatron by one position. Each input also initiates an appropriate timing cycle which is approximately the time required for 370° rotation of the workpiece. At the conclusion of about 370° of workpiece rotation, the Dekatrons are reset to zero if no additional defect inputs occur before the timing cycle has elapsed. If additional deep or shallow defect inputs do occur before a timing cycle has elapsed, the cathode spot of the particular Dekatron will be further advanced.

When the Dekatron spot has advanced to a selected contact terminal, position, an energizing signal is introduced to the memory circuit 189 which retains the energizing signal until the workpiece clears the testing section 13. At this point, the energizing signal is transferred to a time delay relay which causes the proper cradle to open and maintains it open until the workpiece is in that cradle.

It is also to be noted that since the workpiece feeds at a predetermined length of longitudinal travel of each revolution, three inches as in the example, the several positions of the selector switch at the contact terminels S1–S9 can be calibrated in terms of the length of the defect in the workpiece. Thus, in the present example, the contact terminal S52 would represent a defect length of six inches, the contact terminal S53 would represent a defect length of nine inches and so forth, each contact terminal position representing a defect length which is a multiple of three inches. The selector switches 185–187 would then provide analysis of the defect severity in terms of defect length.

*Motor control unit 157*

Referring now to FIGURE 19, each of the roller drive motors 45 are connected across three phase lines L1, L2, L3. Main controller contacts 311, 312, 313, are provided in the lines L1, L2, L3 respectively to control energization of the motors 45. A starting control circuit 314 is connected across lines L1, L2, and includes a series connected solenoid 315 which closes the main contacts 311–313 when energized. A normally open start switch 316, a normally closed stop switch 317, and an indicator light 318 are connected in series in the starter control circuit 314. Overload relay contacts 319, 320 are also provided in series in the starter control circuit 314 and are operated by overload relay coils 321, 322 provided in lines L1, L3 respectively. A normally open contact 323 is connected across the contacts of the normally open start switch 316 and is closed by the solenoid 315 to maintain the continuity of the starter control circuit 314 when the start switch 316 is released.

*Overall control unit 158*

Figure 17:
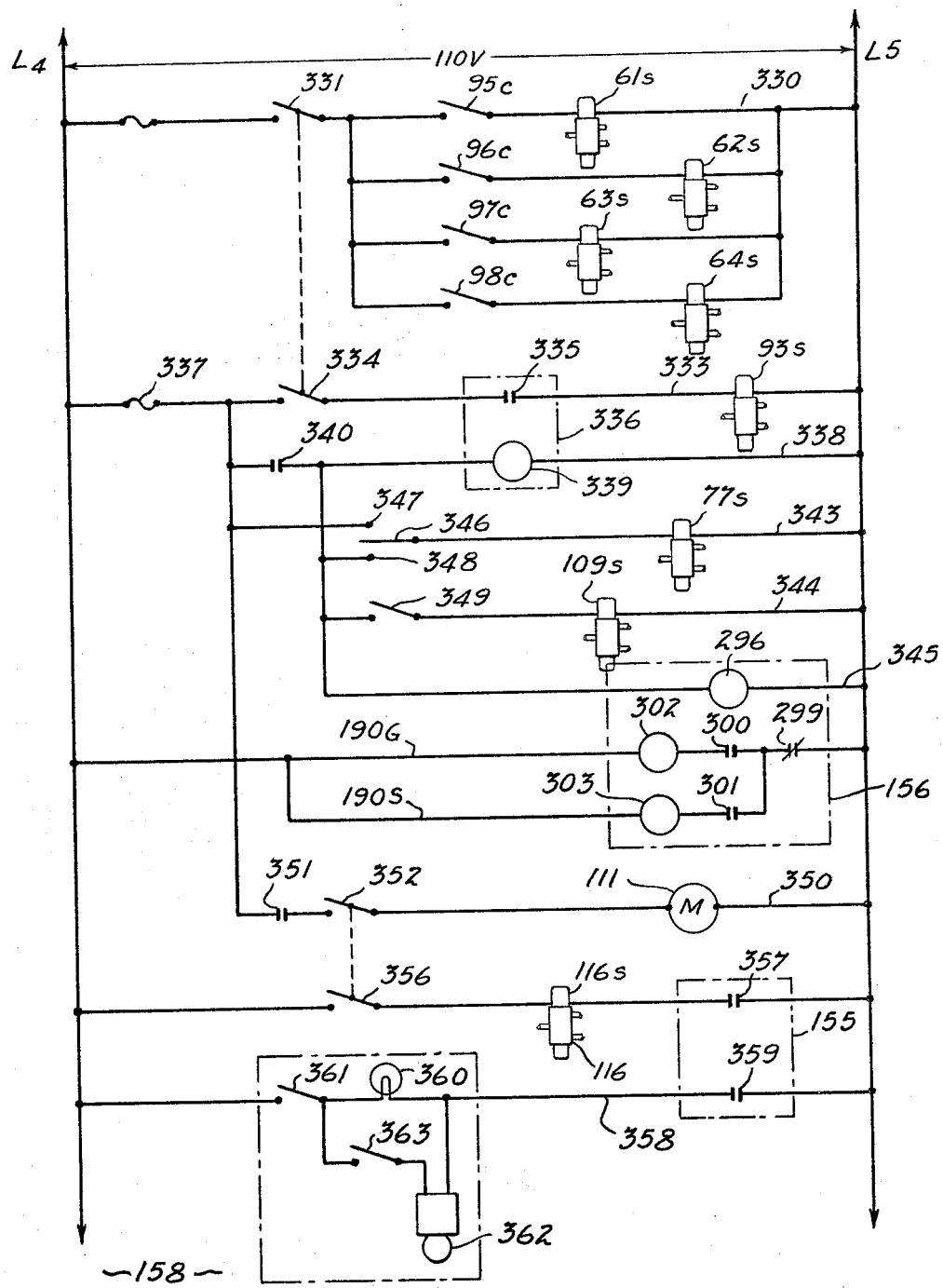
FIGURE 17 is an across-the-line diagram of part of an overall control unit for controlling the various phases of operation of the classifying apparatus of FIGURE 1.

Referring now to FIGURE 17, lines L4, L5 provide 110 volt, 60 cycle energy for the overall control system 158. An entrance section hold-down rollers control circuit 330 is connected across the supply lines L4, L5. The hold-down rollers control circuit 330 includes a manually controlled hold-down roller switch 331 connected in series with a fuse and with a plurality of parallel connected solenoid energizing circuits. There are four feed sections solenoid energizing circuits, one for each of the hold-down actuator solenoids 61s–64s. The lever actuated switch contacts 95c–98c are connected in series with the solenoids 61s–64s respectively in each of the parallel circuits.

A test section hold-down control circuit 333 is connected across the lines L4, L5. The test section hold-down control circuit 333 is a series circuit including a manual hold-down control switch 334 which is mechanically interconnected with the switch 331, the test section hold-down solenoid 93s for actuating the test section hold-down cylinders 92, a normally open contact 335 of a time delay relay 336, and a fuse 337.

A control circuit 338 is connected to the supply line L5 and to the supply line L4 through the fuse 337 and includes a coil 339 of the time delay relay 336 and a normally open contact 340 which is operated by a relay coil 341. The coil 341 is connected in a series circuit 342 across the lines L4, L5 (FIGURE 18) and is energized when the workpiece presence detecting switch 100 is closed by a workpiece entering the testing station 13.

Also connected in series with the contact 340 across the lines L3, L4 are a bar lift solenoid circuit 343, a testing probe lift solenoid circuit 344, and a defect analyzer switching circuit 345, all of which are connected in parallel. The bar lift solenoid circuit 343 includes the entrance section bar lift solenoids 77s and a manual two-position selector switch 346.

The two position switch 346 has a manual operation contact 347 which connects the bar lift solenoid 77s across the lines L4, L5 through the fuse 337 and also an automatic operation contact 348 wherein the bar lift solenoid 77s is only energized when the contact 340 is closed. The testing probe lift solenoid energization circuit 344 includes the probe lift solenoid 109s and a manual switch 349. The defect analyzer switching circuit 345 includes the relay coil 296 and connects the coil 296 across the lines L4, L5 when the contact 340 is closed.

The delay relay circuits 190G, 190S are connected across the lines L4, L5 through the relay contact 299. The delay relay circuit 190G includes the contact 300, which is operated by the memory relay coil 291 in the defect analyzer 156, and the "salvage" delay relay coil 302, which operates a normally closed contact 353 in gate operating circuit 365 (FIGURE 18). The delay relay circuit 190S includes the contact 301, which is operated by the "scrap" memory relay coil 305 in the defect analyzer circuit 156, and the "scrap" delay relay coil 303, which operates a normally closed contact 355 in the gate operating circuit 365.

Also connected across the lines L4, L5 through the fuse 337 is a marker motor energization circuit 350. The marker motor circuit 350 includes a normally open contact 351 which is operated by the relay coil 341, a manually operated switch 352, and the marker motor 111.

A marker solenoid energizing circuit 357 is connected across the lines L4, L5 and includes a manually operated switch 356, a normally open contact 357 from the marker control circuit which is disclosed in the above-identified co-pending application, and the solenoid 116s of the air valve 116 which activates cylinder 114 to move the carbide cutter 112 into engagement with the workpiece each time the contact 357 is closed by the marker control circuit 155.

A visual and audio signal circuit 358 is connected across the lines L4, L5 and includes a normally open contact 359 from the marker control circuit 155, a signal light 360, a manual signal circuit control switch 361, and a signal bell 362 which is connected across the light 360 through a manual bell switch 363. Each time the marker cutter 112 is brought into engagement with the workpiece to mark a defect, the light 360 lights and the bell 362 rings if switches 361, 363 are closed respectively.

As shown in FIGURE 18, a gate solenoid energizing control circuit 365 is provided and includes three solenoid circuits 366–368. The solenoid circuits 366–368 include the gate actuating solenoids 149S–151S respectively, movable switch contacts 369–371 and manual operation position contacts 372–374. When the movable contacts 369–371 engage fixed contacts 372–374 respectively, their respective solenoids are connected across lines L4, L5 and are energized. The movable contacts 369, 370 are also engageable with automatic operation contacts 375–377 respectively. The automatic operation contacts 375, 376 are connected to supply lines L4 through the normally closed "salvage" and "scrap" contacts 353, 355 respectively via conductors 378, 379. The automatic operation contact 377 is connected to the supply L4 through the normally closed "scrap" contact 355 via conductor 380.

In FIGURE 3, cradle bins A and B are normally used for receiving workpieces classified as "good." Cradle bin C is used for receiving workpieces classified as "salvage" and cradle bin D is used for receiving workpieces classified as "scrap." If cradle A is for "good" workpieces, bin C for "salvage" workpieces and bin D for "scrap" workpieces, then the movable switch contacts 369 and 371 are moved to their automatic operation contacts 375, 377 respectively, and the switch contact 370 is maintained in its "off" position not engaging either the manual operation control 373 or the atomatic operation contact 376.

When switches 369, 371 are closed on the contacts 375, 377, the solenoids 149s, 151s are energized through the normally closed "salvage" and "scrap" contacts 353, 355. The energized solenoids 149, 151 cause the cylinders 146, 148 to be activated and raise their respective gates 137, 139 for the cradle bins A and C. If a workpiece is classified as scrap then as will be described, delay relay contact 355 opens to deenergize both solenoids 149s, 151s thus closing the gates 137, 139 and a workpiece placed on the incline of the cradle assembly will roll into the cradle bin D. If a workpiece is classified as "salvage" then contact 353 opens to de-energize solenoid 149s and thus closes gate 137 of bin A. The workpiece on the incline will then roll into bin C which is the first open bin. If a workpiece is classified as "good" then contacts 353 and 355 remain closed so that gates 137, 139 remain raised and the workpiece rolls into bin A.

If bin B is used for "good" workpieces then switch contact 369 is in its open position and contact 370 is closed on automatic operation contact 376. The solenoid 150 is energized through the delay relay contacts 353, 355 to cause gate 138 to open and remain open to receive "good" workpieces until either the "salvage" contact 353 or the "scrap" contact 355 opens as just explained in connection with the solenoid 149 and the gate 137.

An exit section bar lift solenoid energization circuit 385 is connected across the lines L4, L5 and includes a manual ON-OFF switch 387, the normaly closed paddle switch 130 and the exit section bar lift solenoid 129s. The paddle switch 130 includes the actuator paddle or arm 130s which is located at the beginning or the entrance of the exit section as shown in FIGURE 4. Exit motors 119 are also connectable across the supply lines L4, L5, by the manual switches 388, 389.

The operation of the overall control circuit 158 may be best understood from the following description by referring to FIGURES 3–5, 7 and 8 in connection with FIGURES 17 and 18. To set up the overall control circuit 158 for automatic operation, the switches 331, 334, 349, 352, 356, 361, 387 are closed, the cradle switch contact 371 is set over to contact 377, and either cradle switch contact 369 or 370 is moved over to their respective contacts 375, 376 depending on whether cradle A or cradle B is to be first used for "good" workpieces. The switches 316, 388 and 389 are closed to start the drive and exit motors 45, 119. The solenoid actuated air valve 77 is two-way and normally activates the cylinder 74 to maintain the bar lift arms 72 in their up or lift positions when the solenoid 77s of the air valve 77 is not energized. Moving the manual switch 346 to the manual operation contact 347 energizes the bar lift solenoid 77s to cause the cylinder 74 to pull the bar lift arms 72 down permitting the next workpiece to roll onto the mar lift arms 72. This loads the bar lift and when the contact 349 is then moved back to its open position or over to its automatic operation contact 348, the solenoid 77s is de-energized mitting the next workpiece to roll onto the bar lift arms 72. placing the bar or other workpiece onto the inclined members 71. The workpiece then rolls down into the entrance section between the guide members 51 and engages the switches 95–98 closing them to energize the entrance section hold-down roller solenoids 61s–64s of air valves 61–64 respectively which activate the cylinders 57 to bring the hold-down idler rollers 59, 60 of the hold-down assemblies 56 onto the workpiece 18.

As the workpiece 18 moves into the testing section it engages the arm 99 and closes the test section switch 100 to energize the relay coil 341 thereby closing its normally open contacts 340, 351. The closed contact 340 causes the relay coil 339 to be energized and the relay coil 339 immediately closes its normally open contact 335 thereby energizing the solenoid 93s. The solenoid 93s actuates the air valve which in turn activates the test section hold-down cylinders 92 to bring the test section hold-down rollers down onto the workpiece in the test section. The closed contact 340 also causes the bar lift solenoid 77s to be energized to bring the lift arms down to load them with another workpiece. The closed contact 340 also energizes the probe solenoid 109s to activate the probe cylinder 107 and bring the test probe down onto the workpiece as it enters and moves through the testing section. Finally, the closed contact 340 energizes the relay coil 296 which opens its contact 299 to prevent energization of the "salvage" and "scrap" delay relay coils 302, 303 as long as a workpiece is in the testing section.

The now closed contact 351 energizes the marker motor 111 so that it begins its rotation to cause the carbide cutter 112 to mark the workpiece each time the marker solenoid 116s is energized by closure of the normally open contact 357 in the marker control circuit 155.

As has been described, the defect analyzer 156 receives the defect information from the test probe 104 through the classifier circuit 154 and classifies each of the workpieces as either "good," "salvage," or "scrap." If the workpiece is classified as "salvage" then the contact 300 closes to energize the "salvage" delay relay coil 302 as soon as the contact 299 closes indicating that the workpiece has left the testing section and has released the actuator arm 99 of the switch 100. The energized delay relay coil 302 opens the "salvage" contact 353. The contact 353 remains open for a time delay period sufficient to allow the workpiece to enter the "salvage" cradle bin C. If the workpiece is classified as "scrap," then the contact 301 closes to energize the "scrap" delay relay coil 303 as soon as the contact 299 closes. The energized delay relay coil 303 opens the "scrap" contact 355 which in turn causes all the gates 137–139 to be closed. The contact 355 remains open for a time delay period sufficient to allow the workpiece to move down the cradle assembly and into the "scrap" cradle bin D.

Because of its length, a workpiece will normally enter the exit section before it has completely left the testing section and released switch 100. The lift arms 124 in the exit section are normally in raised positions because the bar lift solenoid 129s is energized across lines L4, L5 by the closed paddle switch 130 and the now closed switch 387. As the workpiece enters the exit section it engages the paddle switch arm 130a to open the paddle switch 130 thereby de-energizing the bar lift solenoid 129s. This activates the exit lift cylinder 127 to lower the exit lift arm 124 to below the path of workpiece travel.

When the workpiece leaves the testing section the workpiece presence switch 100 is released and opens to de-energize the coil 341. The de-energized coil 341 opens its contacts 340, 351 to de-energize the circuits 338, 343, 344, 345, and 350. The open control circuit 338 de-energizes the delay relay coil 339 of delay relay 36. The contact 335 of relay 336 opens to de-energize the hold-down solenoid 93s and raise the hold-down arms 89 after a time delay sufficient for the workpiece to leave the testing section. The open bar lift solenoid circuit 343 de-energizes the bar lift solenoid 77s causing it to activate the cylinder 74 which raises the entrance section lift arms 72 to feed another workpiece into the entrance section. This latter workpiece is again acted upon by the testing section and when it leaves the testing section it causes another workpiece to be fed into the entrance section and thus the testing sequence repeats to automatically test and classify one workpiece after another.

When the workpiece has fully entered the exit section and its trailing end has moved past the paddle switch 130, then the paddle switch 130 closes to energize the exit bar lift solenoid 129s which activates the cylinder 127 to raise the exit lift arms 124 sending the workpiece rolling or otherwise moving down the inclined cradle assembly 15 and into an appropriate cradle bin. The position of the paddle switch 130 and its actuator arm 130a may be adjusted longitudinally relative to the path of travel of the workpiece to set the longitudinal positions of the workpieces in the cradle bins A–D.

Having described the present invention in rather specific detail, it may be summarized as comprising an apparatus for classifying and separating workpieces according to the nature of defects in the workpieces which apparatus includes means for detecting the presence of defects in a workpiece and for producing signal pulse indications informative of the number of defects detected, an analyzing means for analyzing this defect information and classifying the workpiece according to its defect content. The invention further contemplates that the basis of classification of the workpieces by the analyzer means be according to the number of defect indications given for a per unit measure of the workpiece. The invention further contemplates that the analyzer means have a plurality of analyzing channels, each channel representing a different degree of defect severity in the inspected workpiece. In each instance, the invention contemplates that the classification information of the analyzer means may be used to operate a suitable gating mechanism for segregating the workpieces according to their defect classification. Finally, the invention contemplates an apparatus for automatically feeding the workpieces to an inspection station where the defect detection means and the analyzer are located.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An apparatus for examining workpieces and separating them according to defect severity, said apparatus comprising:
    (a) defect detector means for sensing defects in a workpiece, said defect detector means having an output producing a defect signal for each defect detected, the level of the defect signal being proportional to the severity of the defect detected;
    (b) classifier means having an input connected to the output of said defect detector means and an output producing a trigger signal for each defect signal of a predetermined level received at its input;
    (c) trigger signal counting means having an input connected to the output of said classifier means and an output producing an energizing signal in response to a predetermined number of trigger signals received at its input; and,
    (d) a workpiece separating mechanism having an input connected to the output of said counting means, and said separating mechanism acting on an examined workpiece each time it receives an energizing signal at its input.

2. The combination of claim 1 including, in combination:
    (e) means for causing relative movement between the defect detector means and the workpiece;
    (f) timing means having an input connected to the output of said classifier means and an output producing a reset signal a predetermined period after receiving the last trigger signal at its input, said predetermined period being related to the relative movement between said defect detector and the workpiece; and,
    (g) said counting means having a reset input connected to the output of said timing means, and the output of said counting means producing said energizing signal only in the event its input receives said predetermined number of trigger signals in the period between reset signals received at its reset input.

3. An apparatus for examining workpieces and segregating them according to defect severity, said apparatus comprising:
    (a) defect detector means including a probe positionable adjacent a workpiece for sensing defects in the workpiece, said defect detector having an output producing a defect signal for each defect detected, the level of the defect signal being proportional to the severity of the defect detected;
    (b) means supporting said defect detector means and a workpiece and moving one relative to the other so that the detector means examines the workpiece area by area;
    (c) timing means having an output producing a reset signal after the defect detector has examined a predetermined area of the workpiece;
    (d) a trigger signal counting means having a counting input, a reset input and an energizing signal output, said counting input being connected to the output of said defect detector means, said reset input being connected to the output of said timing means, said energizing signal output producing an energizing signal in response to a predetermined number of trigger signals being received at its counting input before a reset signal is received at its reset input; and,
    (e) a defective workpiece indicator having an input connected to the output of said counting means, and said indicator being energized to indicate a defective workpiece each time it receives an energizing signal at its input.

4. An apparatus for detecting defects of a predetermined length in an elongated workpiece, said apparatus comprising:
    (a) defect detector means positionable adjacent a workpiece for sensing defects in the workpiece, said defect detector means having an output producing a defect signal for each defect detected;
    (b) support and propelling means for causing longitudinal and rotatable relative movement of the defect detector means and the workpiece so that one revolution of the workpiece represents a predetermined workpiece length;
    (c) said defect detector means having an output producing a defect signal each time a defect is detected as the workpiece and the detector means move relatively; and, (d) defect signal counting means having a counting input and an energizing signal output, said counting input being connected to the output of said defect detector means, said energizing signal output producing a signal indication in response to a predetermined number of defect signals being received at the counting input whereby the length of the defect to be detected is the product of said predetermined workpiece length and said predetermined number of defect signals.

5. The apparatus of claim 4 including in combination:
(e) said defect signal counting means having a reset input, and the energizing signal output producing said signal indication only when said predetermined number of defect signals is received at the counting input before a reset signal is received at said reset input; and,
(f) timing means having an input connected to the output of said detector means and an output connected to the reset input of said defect signal counting means, said reset output producing a reset signal only after a predetermined period since the last defect signal received at the timing means input, said predetermined period being slightly greater than the period for one revolution of the workpiece.

6. An apparatus for detecting defects of a predetermined length in an elongated workpiece, said apparatus comprising:
(a) defect detector means positionable adjacent the workpiece for sensing defects in the workpiece, said defect detector means having an output producing a defect signal for each defect detected;
(b) support and propelling means for moving the workpiece longitudinally and rotatably relative to the defect detector means so that one revolution of the workpiece represents a predetermined workpiece length;
(c) defect signal counting means having a counting input, a reset input, and an energizing signal output, said counting input being connected to the output of said defect detector means, said energizing signal output producing a signal indication in response to a predetermined number of defect signals being received at the counting input before a reset signal is received at its reset input; and,
(d) timing means having an input connected to the output of said detector means and an output connected to the reset input of said defect signal counting means, said reset output producing a reset signal only after a predetermined period since the last defect signal received at the timing means input, said predetermined period being at least the period for one revolution of the workpiece whereby said predetermined number of defect signals is directly related to the lengths of a defect detected and indicated.

7. The apparatus of claim 6 wherein said defect signal counting means includes:
(i) a counter having a plurality of consecutively arranged outputs, a signal appearing at one of said outputs advancing to the next consecutive output each time a defect signal is introduced to said counting input;
(ii) a selector switch means selectively connectable with each of said counter outputs; and,
(iii) a signal indicator connected to said switch means and providing the signal indication whenever a signal appears at the output to which the selector switch means is connected whereby each consecutive counter output represents a multiple of said predetermined workpiece length, and a signal appearing at an output is indicative of a defect having a length which is that output's multiple of said predetermined workpiece length.

8. An apparatus for analyzing the defect content of a workpiece; said apparatus comprising:
(a) a defect detection means including a probe positionable adjacent a workpiece for sensing defects in the workpiece, said detection means having an output producing a defect signal for each sensed defect of a predetermined severity;
(b) a timing means having an input connected to the output of said detection means and an output producing a reset signal only a predetermined period after the last defect signal received at its input;
(c) a signal counting means having a counting input, a reset input and an indicator signal output, said counting input being connected to the output of said detection means, said reset input being connected to the output of said timing means, and said indicator output producing a signal indication if a predetermined number of defect signals are received at said counting input before a reset signal is received at said reset input.

9. The device of claim 8 including, in combination:
(d) means for supporting a workpiece and said detection means and moving them relatively so that the detection means examines the workpiece area by area; and,
(e) the predetermined period of said timing means being related to the relative movement of the workpiece and said detection means so that a signal indication produced by said indicator output is indicative of a predetermined number of defects of a predetermined severity per unit area of the workpiece.

10. The apparatus of claim 8 wherein said signal counting means includes:
(i) a cold cathode counting tube having guide electrodes at said counting input and a plurality of numerically consecutive cathodes;
(ii) impedance means connected to the first of said cathodes and to the output of said timing means to cause a voltage signal appearing at another cathode to shift to said first cathode each time a reset signal is produced by the output of said timing means;
(iii) a selector switch selectively connectable to any one of the remaining cathodes; and,
(iv) an electrical signal responsive device connected to said selector switch and being energized when an electrical signal appears on the cathode to which the selector switch is connected.

11. The apparatus of claim 10 wherein said timing means includes:
(i) a tube connected as a phantastron with its suppressor grid coupled to its screen grid and arranged to run free;
(ii) a plate of the phantastron tube being clamped by a diode to a pre-determined reference voltage;
(iii) a capacitor circuit means coupling said plate to a control grid of the phantastron tube so that discharging of the capacitor increases the control grid voltage and causes a linear decrease in the plate voltage from said predetermined potential, the period of plate voltage run-down comprising said predetermined period of the timing means;
(iv) means connecting the suppressor grid to the output of said defect detection means so as to supply a negative defect signal pulse to the suppressor grid for each defect indication of said predetermined severity, each negative defect signal re-initiating plate voltage run-down from said reference potential; and,
(v) said impedance means connecting the plate of said vacuum tube to the first cathode of said counting tube.

12. The apparatus of claim 11 including, in combination:
(d) a single-shot multi-vibrator interposed between the output of said defect detection means and the inputs of said timing means and of said signal counting means, said multivibrator introducing a signal pulse of predetermined duration to said inputs each time the multivibrator receives a defect signal from said defect detection means.

13. The apparatus of claim 12 including, in combination:
(e) a reset tube having its plate-cathode circuit connected across a power supply, a control grid, means biasing said control grid below tube cut-off, means connecting said control grid to the plate of the phantastron tube so as to bias the control grid to cause tube conduction when the plate voltage of the phantastron increases to a predetermined level, a second grid connected to the multivibrator and preventing tube conduction when a signal pulse is produced by the multivibrator whereby each time the phanastron tube plate voltage increases to said predetermined level said control grid causes said tube to conduct and to thereby introduce a reset signal to said counting means, and said second grid prevents conduction of said reset tube each time the timing period of the phantastron is re-initiated by a signal pulse from the multivibrator.

14. An apparatus for examining and segregating workpieces according to the degree of defect severity, said apparatus comprising:
(a) defect detector means positionable adjacent a workpiece for sensing defects in the workpiece, said defect detector having an output producing a defect signal for each defect detected, the level of the defect signal being proportional to the degree of severity of the defect detected;
(b) classifier means having a defect signal input and first and second trigger signal outputs, said defect signal input being connected to the output of said detection means, said first trigger signal output producing a trigger signal for each defect signal of a first predetermined level received at said defect signal input, and said second trigger signal output producing a trigger signal for each defect signal of a second predetermined level received at said defect signal input;
(c) first and second counting channels each having an input and an output, the inputs of said first and second channels being connected to said first and second trigger signal outputs respectively, and the outputs of said first and second channels producing energizing signals in response to first and second predetermined numbers of trigger signals received at their inputs respectively; and,
(d) first and second gate means connected to the outputs of said first and second channels respectively, said first gate means being responsive to energizing signals from said first counting channel to segregate examined workpieces having defects of a first degree of severity, and said second gate means being responsive to energizing signals from said second counting channel to segregate examined workpieces having a second degree of defect severity.

15. An apparatus for examining and separating workpieces according to the degree of defect severity, said apparatus comprising:
(a) defect detector means positionable adjacent a workpiece for sensing defects in the workpiece, said defect detector having an output producing a defect signal for each time a defect is detected, the level of the defect signal being proportional to the degree of severity of the defect detected;
(b) classifier means having a defect signal input and first and second trigger signal outputs, said defect signal input being connected to the output of said detection means, said first trigger signal output producing a trigger signal for each defect signal of a first predetermined level received at said defect signal input, and said second trigger signal output producing a trigger signal for each defect signal of a second predetermined level received at said defect signal input;
(c) first and second counting channels, each counting channel comprising:
(i) a channel input;
(ii) a plurality of channel outputs arranged in numerical order, an energizing signal appearing at one of said channel outputs in response to a trigger pulse being received at the channel input, said energizing signal sequentially advancing from one output to the next output in response to each trigger signal received at the channel input; and,
(iii) a channel output selector contact means selectively positionable at each of said channel outputs; and,
(d) first and second gate means connected to the selector contact means of said first and second channels respectively, said first gate means being responsive to energizing signals from said first channel to segregate examined workpieces having a first predetermined number of defect indications of a first degree of severity, and said second gate means being responsive to energizing signals from said second channel to segregate examined workpieces having a second predetermined number of defect indications of a second degree of severity.

16. The apparatus of claim 15 including, in combination:
(e) an auxiliary channel output selector contact means selectively positionable at each of the channel outputs of said second counting channel and connected to the contact means of the said first counting channel so that the first gate means is responsive to energizing signals from either channel to segregate examined workpieces having either said first predetermined number of defect indications of said first degree of severity or a third predetermined number of defect indications of said second degree of severity as set by the first and auxiliary selector contact means respectively.

17. An apparatus for examining and segregating workpieces according to the degree of defect severity, said apparatus comprising:
(a) defeat detector means positionable adjacent a workpiece for sensing defects in the workpiece, said defect detector having an output producing a defect signal for each defect detected, the level of the defect signal being proportional to the degree of severity of the defect detected;
(b) classifier means having a defect signal input and first and second trigger signal outputs, said defect signal input being connected to the output of said detection means, said first trigger signal output producing a trigger signal for each defect signal of a first predetermined level received at said defect signal input, and said second trigger signal output producing a trigger signal for each defect signal of a second predetermined level received at said defect signal input;
(c) an analyzer means having first and second analyzer channels, said first and second analyzer channels having inputs connected to said first and second trigger signal outputs respectively, each of said channels comprising:
(i) timing means having an input connected to the input of its respective channel and an output producing a reset pulse a predetermined period after receiving the last trigger signal at its input;
(ii) trigger signal counting means having a counting input, a reset input, and a plurality of signal outputs arranged in numerical order, said counting input also connected to the input of its respective channel, said reset input being connected to the output of said timing means, an energizing signal appearing at one of said signal outputs in response to a trigger signal received at the counting input, said energizing signal sequentially advancing from one output to the next output in response to each trigger signal received at the channel input until a reset signal is received at said reset input whereupon said energizing signal shifts to the first of the numerically arranged outputs;

(iii) a channel output selector contact means selectively positionable at each of said energizing signal outputs; and, (d) first and second gate means connected to the selector contact means of said first and second analyzer channels respectively, said first gate means being responsive to energizing signals from said first channel to segregate inspected workpieces having a first predetermined number of defect indications of a first degree of severity, and said second gate means being responsive to energizing signals from said second analyzer channel to segregate inspected workpieces having a second predetermined number of defect indications of a second degree of severity.

18. The apparatus of claim 17 including, in combination:

(e) an auxiliary channel output selector contact means selectively positionable at each of the energizing signal outputs of said second analyzer channel and connected to the selector contact means of said first analyzer channel so that said first gate means is responsive to energizing signals from either analyzer channel to segregate examined workpieces having either said first predetermined number of defect indications of said first degree of severity or a third predetermined number of defect indications of said second degree of severity as set by the first and auxiliary selector contact means respectively.

19. A workpiece inspection apparatus comprising:

(a) a workpiece inspection section;
(b) a feed section on one side of said inspection section for feeding workpieces into said inspection section;
(c) a cradle section on the other side of said inspection section for receiving workpieces from said inspection section, said cradle section having a plurality of workpiece receiving bins and at least one gate enclosing one bin, said gate being movable from a first position whereby a workpiece delivered to said cradle section is received in one of said bins to a second position whereby a workpiece delivered to said cradle section is received in another of said bins;
(d) gate operating means connected to said gate and being operative to move said gate from one position to another in response to an energizing signal applied to its input;
(e) a defect detection means located in said inspection section and having an output producing a defect signal for each defect detected;
(f) defect signal counting means having an input connected to the output of said defect detection means and an output producing an energizing signal in response to a predetermined number of defect signals received at the counting means input;
(g) means connecting the output of said counting means to the input of said gate operating means so that said gate is in one of its positions when the output of said defect detection means produces said predetermined number of defect signals and the gate is in the other of its positions when less than said predetermined number of defect signals is produced by the output of said defect detection means.

20. The apparatus of claim 19 including, in combination:

(h) memory circuit means interposed between the output of said counting means and the input of said gate operating means, said memory circuit means preventing transfer of said energizing signal to the input of said gate operating means until the inspected workpiece has substantially left the inspection section.

21. The apparatus of claim 20 wherein said memory means has a normally closed switch contact connected between the output of said counting means and the input of said gate operating means and the switch contact is actuated to an open position by an actuator arm carried by one of said sections and located in the path of workpiece travel so as to be moved by the workpiece as it travels through the inspection section.

22. A workpiece inspection apparatus comprising:

(a) a workpiece inspection section;
(b) a feed section on one side of said inspection section for feeding workpieces into said inspection section;
(c) a cradle section on the other side of said inspection section for receiving workpieces from said inspection section, said cradle section having a plurality of workpiece receiving bins and at least one gate enclosing one bin, said gate being movable from a first position whereby a workpiece delivered to said cradle section is received in one of said bins to a second position whereby a workpiece delivered to said cradle section is received in another of said bins;
(d) gate operating means connected to said gate and being operative to move said gate from one position to another in response to an energizing signal applied to its input;
(e) at least one of said sections including propelling means for moving a workpiece through said inspection section at a predetermined rate of workpiece travel;
(f) defect detecting means located in said inspection section and having an output producing a defect signal for each defect detected;
(g) timing means having an input connected to the output of said defect detection means and an output producing a reset signal a predetermined period after receiving the last defect signal at its input, said predetermined period being related to a predetermined relative movement between said defect detector means and the workpiece;
(h) defect signal counting means having a counting input, a reset input, and an energizing signal output, said counting input being connected to the output of said defect detection means, said reset input being connected to the output of said timing means, and said energizing signal output producing an energizing signal in response to a predetermined number of defect signals being received at its counting input before a reset signal is received at its reset input; and,
(i) means connecting the output of said counting means to the input of said gate operating means so that said gate is in one of its positions when the defect detection means produces said predetermined number of defects within said predetermined period and the gate is in the other of its positions when said defect detection means produces less than said predetermined number of defect signals within said predetermined period.

23. The apparatus of claim 22 wherein said propelling means axially rotates the workpiece during its movement through the inspection section.

24. The apparatus of claim 22 wherein the predetermined period of said timing means is at least the period required for one revolution of the workpiece.

(References on following page)

References Cited by the Examiner

UNITED STATES PATENTS

| | | | |
|---|---|---|---|
| 2,648,435 | 8/1953 | Kodis | 209—81 X |
| 2,860,777 | 11/1958 | Ortegren et al. | 209—81 X |
| 2,942,729 | 6/1960 | Bowen | 209—81 X |
| 2,979,196 | 4/1961 | Harmon | 324—34 X |
| 2,989,179 | 6/1961 | Woods et al. | 209—81 X |
| 3,180,230 | 4/1965 | Judd et al. | 324—37 X |

M. HENSON WOOD, Jr., *Primary Examiner.*

A. N. KNOWLES, *Assistant Examiner.*